(12) United States Patent
Bishel

(10) Patent No.: US 7,761,555 B1
(45) Date of Patent: Jul. 20, 2010

(54) INTERNET/INTRANET-CONNECTED AC ELECTRICAL BOX

(76) Inventor: Richard Anthony Bishel, 16020 NW. Ridgetop La., Beaverton, OR (US) 97006

( * ) Notice: Subject to any disclaimer, the term of this patent is extended or adjusted under 35 U.S.C. 154(b) by 668 days.

(21) Appl. No.: 10/214,086

(22) Filed: Aug. 6, 2002

(51) Int. Cl.
*G06F 15/173* (2006.01)

(52) U.S. Cl. .................. 709/224; 709/217; 709/218; 709/223; 340/310.18; 340/531; 702/62

(58) Field of Classification Search .............. 709/217, 709/218, 223, 224; 705/26; 370/252; 340/310.18, 340/531; 713/171; 702/62
See application file for complete search history.

(56) References Cited

U.S. PATENT DOCUMENTS

| | | | |
|---|---|---|---|
| 5,956,487 A * | 9/1999 | Venkatraman et al. ...... 709/218 |
| 6,363,057 B1 * | 3/2002 | Ardalan et al. ............... 370/252 |
| 6,653,933 B2 * | 11/2003 | Raschke et al. ............. 370/203 |
| 6,759,956 B2 * | 7/2004 | Menard et al. ......... 340/539.19 |
| 6,854,059 B2 * | 2/2005 | Gardner ...................... 713/171 |
| 6,894,609 B2 * | 5/2005 | Menard et al. .............. 340/531 |
| 6,993,289 B2 * | 1/2006 | Janik ........................ 455/41.2 |
| 7,245,212 B2 * | 7/2007 | Cope et al. ................... 340/538 |
| 2001/0034778 A1 | 10/2001 | Venkatraman et al. |
| 2001/0034779 A1 | 10/2001 | Venkatraman et al. |
| 2001/0044751 A1 * | 11/2001 | Pugliese et al. ............... 705/26 |
| 2001/0044836 A1 | 11/2001 | Venkatraman et al. |
| 2002/0112047 A1 * | 8/2002 | Kushwaha et al. .......... 709/223 |
| 2002/0186125 A1 * | 12/2002 | Li ........................ 340/310.08 |
| 2004/0138835 A1 * | 7/2004 | Ransom et al. ............... 702/62 |

OTHER PUBLICATIONS

Richard Ames, "Building an Embedded Web Server from Scratch," *Circuit Cellar INK®*, Feb. 1998, pp. 20-28, Issue 91, Circuit Cellar, Inc. Vernon, CT USA.

Gaetano Borriello and Roy Want, "Embedded Computation Meets the Worldwide Web," *Communications of the ACM*, May 2000, vol. 43, No. 5.

\* cited by examiner

*Primary Examiner*—Yves Dalencourt

(57) ABSTRACT

A method and apparatus that uses the Internet protocol, TCP/IP, for a home control network. The apparatus also provides embedded servers, email clients at the electrical boxes. The apparatus integrates the Internet to the electrical outlet, switch or appliance boxes using a low cost embedded web server.

18 Claims, 24 Drawing Sheets

INTERNET/INTRANET-CONNECTED AC ELECTRICAL BOX

FIELD OF INVENTION

The invention relates generally to home networks and more particularly to TCP/IP-enabled electrical boxes for controlling and monitoring lighting, outlets, and sensors via the home Intranet or Internet.

BACKGROUND OF THE INVENTION

Current home or industrial networking technologies have two separate networks. One network connects the PCs to the Internet via a dial-up phone, cable, xDSL, or Ethernet connection, and another network such as CEBus™, LonWorks™, or X-10™ to control the appliances or equipment. CEBus™ was developed by the Electronic Industries Association, LonWorks™ was developed by Echelon Corp. of California, and X-10™ components are manufactured by X-10 Limited of Hong Kong. When one wants to remotely control the appliance via the Internet, one needs a converter, a specialized gateway, or software in a computer to interface between the Internet and the other networks.

For example, U.S. Pat. No. 4,200,862 shows one of popular protocols called X-10™ used in homes to control the lights and appliances. It uses dedicated transmitters at various locations in the home to control slave receivers that are designed to plug into the electrical outlets or designed to replace existing switches or outlets. The protocol is very restrictive and cannot handle very much data since it transmits 120 data bits/s over the existing power lines. To communicate on the Internet, the PC or similar device with proprietary software is needed to convert information and control data from the X-10™ system to the Internet. Similarly, LonWorks™ and CEBus™, are two other networks that are being used in the home to control the lights and appliances.

U.S. Patent Application 2001/0034754 A1 defines a specialized gateway between CEBus™, LonWorks™, or X-10™ and the Internet as an attempt to solve the issue of remotely controlling the lights and appliances.

U.S. Pat. No. 5,949,779 discusses remotely controlling home electrical outlets and appliances by the CEBus™ protocol and proprietary BAN, Broadband Access Network. A converter is needed to link the two systems. U.S. Patent Application No. 2002/0002627 A1 describes a scheme to control devices remotely, but uses a home protocol as described in U.S. Pat. No. 5,991,795, and a specialize gateway called emGateWay™. U.S. Patent Application No. 2002/0027504 A1 describes embodiment that allows devices attached to the Internet to communicate to dedicated sensors via a site controller that translate the wireless sensors information to the Internet. This also is a dedicated proprietary device that requires specialized software.

U.S. Pat. No. 6,370,448 B1 describes a process device, which is attached to a process communication network and then to the Internet via a process communicator. The process communication network is one of the following types: low-speed Fieldbus protocol (H1), high-speed Fieldbus protocol (H2), or similar types. The process communicator converts the process communication protocol from each node link, which contains Internet address information to Ethernet data network, which connects to the Internet. Similarly, U.S. Pat. No. 6,363,057 B1 describes an electronics meter, which incorporates a TCP/IP protocol suite and an HTTP server to provide direct access to the meter data via the Internet. However, it too relies on a specialized gateway to non-TCP/IP network such as CEBus™.

U.S. Pat. No. 5,956,487 talks about incorporating a web access in wide variety of devices including office equipment, home-based equipment, and lab equipment, as well as a variety of other types of devices commonly provide device specific user interface functions. Office equipment devices typically include printers and copiers. Home-based devices include home entertainment equipment such as televisions, video recorders, and audio players as well as security systems, and appliances. Lab equipment includes measurement devices such as oscilloscopes and spectrum analyzers. The web server functionality is embedded in the device allows a web browser accesses to user interface functions for the device through a web page. These types of devices have the computing power or can be easily added to the device to provide web server functionality. U.S. Pat. No. 5,956,487 further describes devices that control the user interface to the device, but does not describe control of house lighting and electrical outlets or control of power to the device. In fact, every home appliance or home entertainment equipment must have this web server functionality to control its operation via the Internet. This would limit the control to devices with this web server functionality and would not allow control of existing home appliances or home entertainment equipment.

U.S. Pat. No. 6,198,479 B1 describes a home network, browser-based command and control for the TV, audio equipment that uses a software agent. A software agent is executed on the client device to cause a user interface to be displayed on the client device. The devices describe in U.S. Pat. No. 6,198,479 B1 are entertainment equipment and the home network is the Intranet within the home which connects PCs. The control of home entertainment equipment would be limited to devices with this specialized software agents and would not allow control of existing home appliances or home entertainment equipment.

All previous art describes systems that requires a specialized converter or gateway to translate the home control network such as CEBus™, X-10™, and LonWorks™ to TCP/IP protocol of the home Intranet network or requires that the TCP/IP protocol be incorporated in the appliance or home device. The major disadvantage of the current approaches is that there are too many different types of home networks. Each type of network has specialized controllers to control the electrical load. The proprietary converters or gateways require specialized software for the different networks and this specialized software needs to be updated with new software when new devices are added to these home control networks. The consumer may be overwhelmed with what equipment to purchase and in many cases, a specialist would be require to install and verify the proper operation. Also, with TCP/IP embedded in the home appliance or equipment, the existing home appliances and equipment could not be control over the home Intranet. Therefore, there exists a need for an apparatus that incorporates the TCP/IP protocol into the home electrical boxes so as to have the same home Intranet that connects PCs, printer, and other web appliances to be used for control over existing home appliances, entertainment equipment, and electrical loads. Using a standardized TCP/IP protocol for the home control network would allow the user of standardized web browsers such as Microsoft Internet Explorer or Netscape Communicator to view the electrical load status or control the AC electrical load without using a dedicated controller or a web-based home appliance or equipment.

SUMMARY OF INVENTION

The present invention has solved the problems cited above, and is an apparatus that uses the common communication standard for information, the TCP/UDP/IP protocol, to control electrical loads and/or sensors, to monitor a house or other dwelling or structure using sensors, and to provide numerous other capabilities when attached to the Internet or Intranet. The apparatus is mountable within an electrical box, in particularly, a standard AC electrical box.

The invention integrates the TCP/UDP/IP protocol in the electrical outlets, switches, and other electrical boxes. With this capability, the home Intranet used to connect Internet appliances such as PCs, printers, and others can be used also for controlling and monitoring the electrical connections in the electrical boxes.

The invention may incorporate a web server in the electrical box to monitor and control items attached or connected to the electrical box via a web browser. This web browser can be a local PC connected to the home Intranet or a remote PC connected to the World Wide Web, the Internet. The web browser would request information from the apparatus called AC power circuit using the HTTP protocol. The apparatus within the electrical box would respond with an HTML or XML formatted web page. The web page would contain CGI or other server-controlled capabilities to allow control of an attached electrical load, to change information on the web page, or to alter the monitoring sensor characteristics.

The invention may provide an e-mail capability in the electrical box to send e-mail upon activation of a light switch, a motion sensor, or any other attached sensors, or programmed conditions. One can monitor the electrical power status of the light, HVAC system, or attached appliance, and send e-mail if the attached device is not working or consuming too much electrical power. In addition, one can send e-mail to the electrical box to turn the electrical load ON or OFF, to update stored information such as a software program attached to the e-mail, or to accomplish a number of other tasks associated with e-mail capability. With a camera sensor designed within the AC power circuit, one can send e-mail with attached picture to indicate the presence of the school children.

The invention can control the lights, outlets, and electrical boxes via a connection to the Internet or Intranet whether the connection is within the home or remote. The application program on the device such as the PDA, PC, laptop, or web-enabled phone communicates directly to the electrical box via the TCP/IP or UDP/IP protocol. Each AC power circuit within each electrical box has a unique IP number which any device using the an instant messaging protocol can control the electrical boxes AC power to the electrical load, can check the sensor incorporated within or attached to the electrical box, or can transmit a voice message. In this invention, the electrical box is controlled using the Internet protocol and instant messaging capability. Any Internet-connected devices with the instant messaging protocol such as AOL instant messaging, Microsoft instant messaging protocol, or some other instant messaging scheme can control the attached appliance to the electrical box. A web browser is not needed to display a web page in this particular configuration. The AC power circuit within the electrical box would send the status upon an instant messaging request from the Internet-connected device. This allows Internet-controlled devices with small screens such a web-enable phones, PDAs, or web-enabled pagers to control the lights and appliances in the home.

The invention can collect information on the attached sensor or electrical load and to store it within its memory until a pre-programmed time interval, pre-programmed amount of data, or some other event that indicates the AC power circuit to transmit the information to some server for data collection or requested to do so by a web client or Internet-connected device. With this capability, the AC power circuit can monitor the amount of electrical power consume by the attached device, the number of activations of a switch, the number of times the room is occupied, the number of times the electrical outlet is used, the temperature of the room, the number of times the appliances are being used and at what times. With this information, people can determine the amount of electrical power consumed by the household and what appliances are the major users. Homeowners or occupants can determine which rooms are being heated or cooled, and which rooms are occupied. By examining this information, one can determine the efficiency of the HVAC system. Other information can be collected to help the home occupants live a better life.

The invention can use the current wired and wireless home Intranet technologies as the network interfaces of the AC power circuit. Wired technologies such as phone lines, Ethernet (CAT 5 cable), and powerline technology are a few of the current types. Phoneline technology utilizes the existing telephone networks to transmit the data. Ethernet wired technologies uses a dedicated cable such as CAT5. PCs, printers, and the inventions could be connected via a hub. Newer homes are being built with category 5 cabling throughout the homes. Powerline technology uses the existing electrical wires to transmit the data.

The wireless technologies such as IEEE 802.11 (known as wireless Ethernet), HomeRF™ (developed by HomeRF Working Group), and Bluetooth™ (Bluetooth Signal, Inc.) are some of the current types.

The invention may utilize single-wire connection or dual-wire connection to the AC power circuit. Using single-wire AC power circuit allows for incorporating the TCP/IP capability in older homes using wireless or powerline technologies.

DESCRIPTION OF INVENTION

Figure 1:
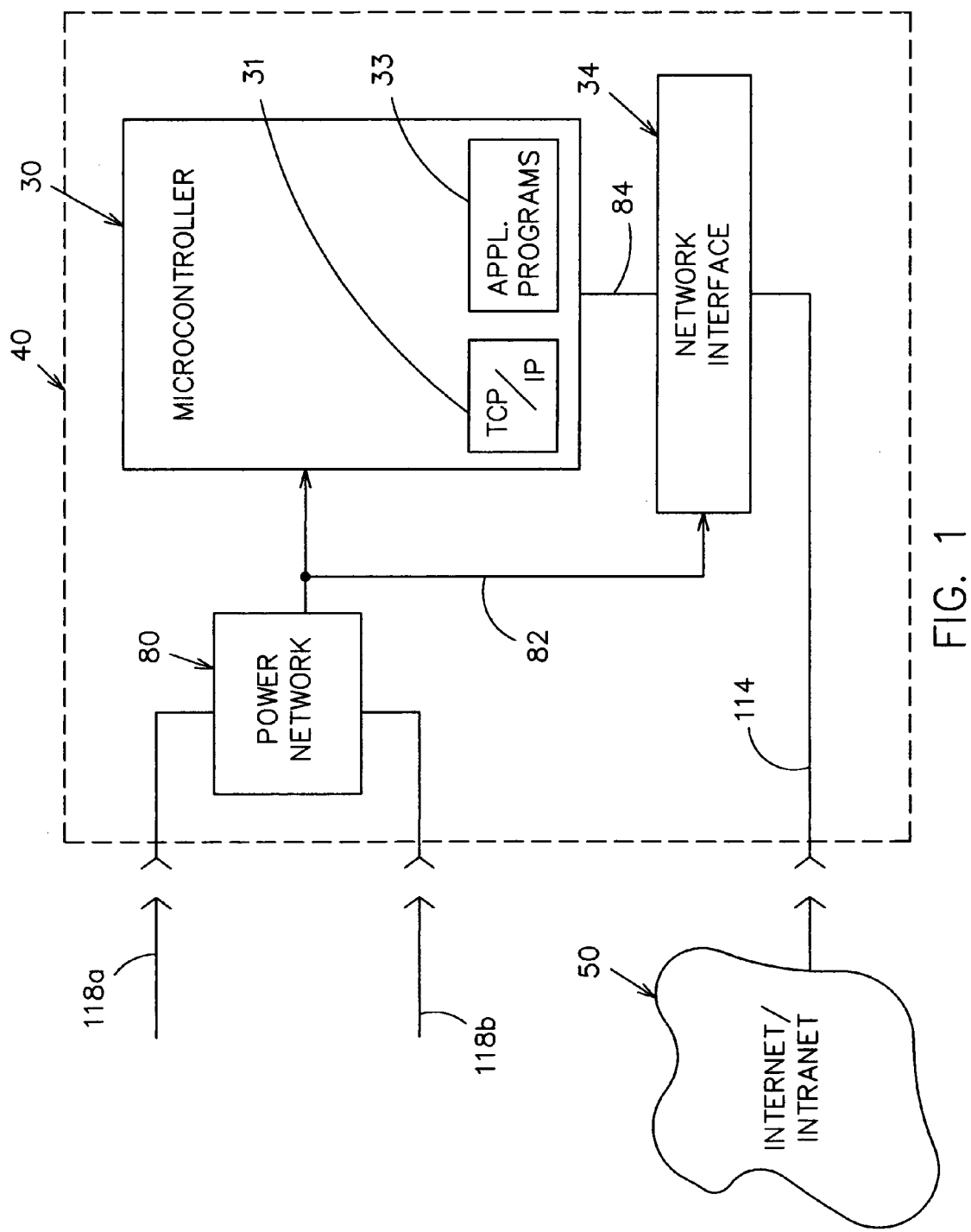
FIG. 1 is a block diagram of the AC power circuit of the present invention showing the basic circuit blocks.

FIG. 1 shows a block diagram schematic of the AC power circuit 40 in which AC power from AC source leads 118a and 118b is applied to circuit and the AC power circuit 40 is connected to the Internet/Intranet 50 via communication connection 114. The AC power circuit 40 includes a power network 80, a microcontroller 30, and a network interface 34. The power network 80 provides low voltage through line 82 to operate the microcontroller 30 and network interface circuitry 34. The microcontroller 30 contains the Internet protocol stack 31 and the application program 33. The microcontroller 30 is connected to the network interface 34 via connection 84. The microcontroller 30 runs one or more application programs 33 that can respond to a web browser request or an internet request, is able to send e-mail, to collect data, to control an attached appliance via the Internet/Intranet, to receive sensor information from attached sensors, or accomplished a number of different tasks.

Figure 2:
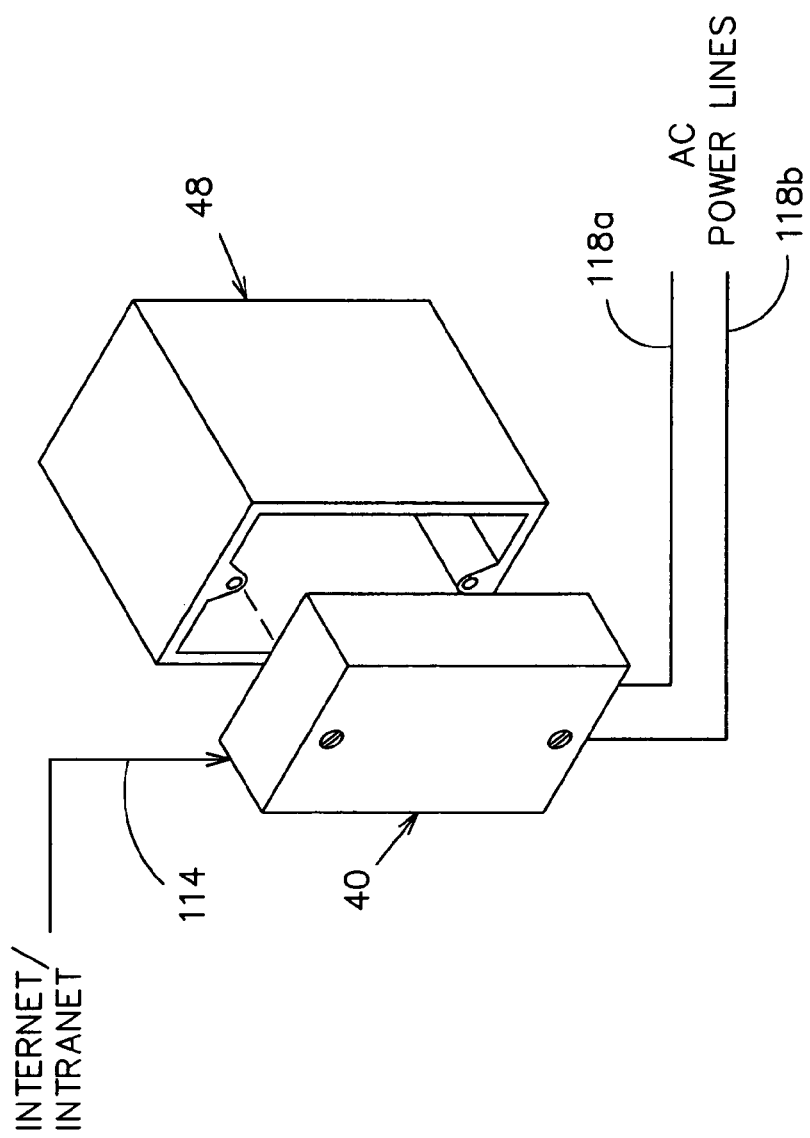
FIG. 2 is a simplified perspective view showing an installation of the AC power circuit of FIG. 1 in the electrical box attached to the AC power lines and the Intranet/Internet.

The AC power circuit 40 is installed in an electrical box 48 as shown in FIG. 2. The AC power is provided via lines 118a and 118b. The communication connection 114 to the Internet/Intranet can be wired or wireless as shown in FIGS. 3 and 4.

Figure 3:
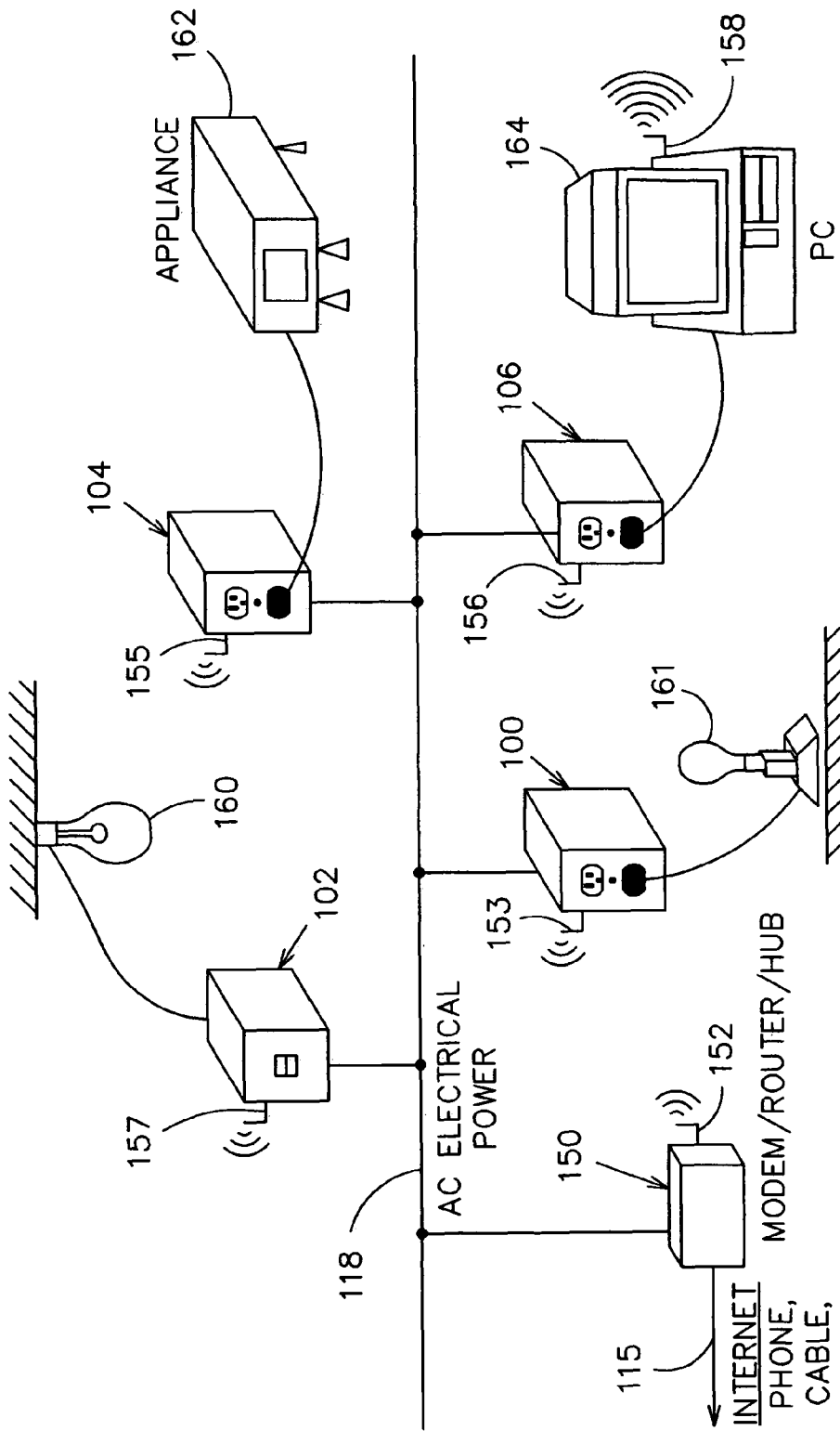
FIG. 3 is an overall diagram of electrical boxes and loads connected wirelessly via the home Intranet and the AC electrical power using the present invention.

FIG. 3 shows a wireless attachment to the Internet via modem/router/hub 150. The wireless Intranet communication connections are via antennas 152, 153, 155, 156, 157, and 158. The electrical boxes 100, 102, 104, and 106 are connected via the AC electrical wires 118. The electrical boxes contain the AC power circuit 40 which can control the lights 160, 161, and any attached appliances such as TV 162 or Personal Computer 164. Each AC power circuit 40 can be controlled via the local control such as a switch or PC via the home Intranet, or by remote control via the Internet connection 115. The wireless communication can be HomeRF™, IEEE 802.11, Bluetooth™, or any other wireless Internet technology.

Figure 4:
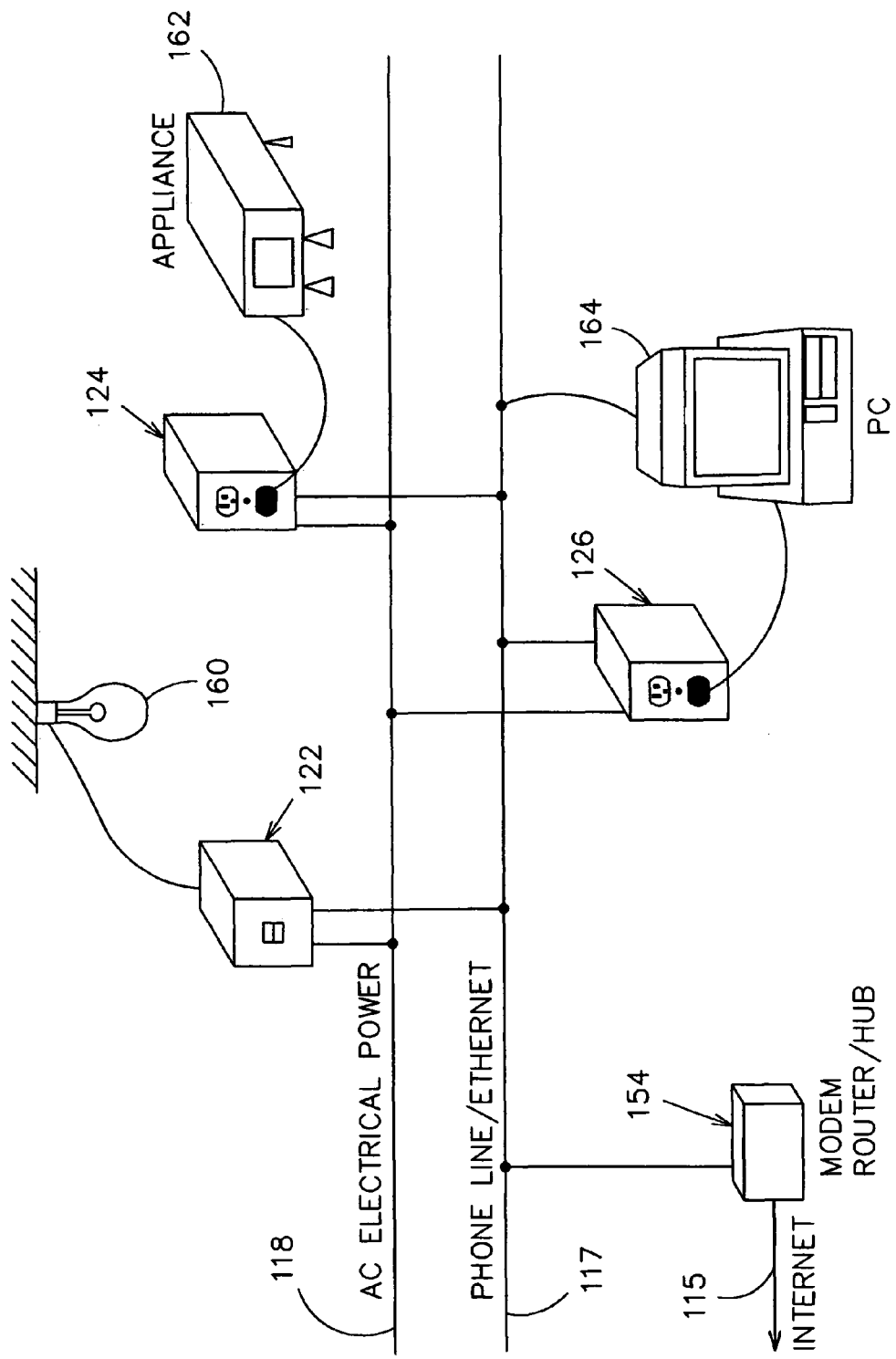
FIG. 4 is an overall diagram of electrical boxes and loads connected with the AC electrical power and the wired home Intranet.

FIG. 4 shows a wired attachment to the Internet via modem/router/hub 154. The wired Intranet communication connection 117 is via a phone lines, fiber, coax, or Ethernet cable. The electrical boxes 122, 124, and 126 contain the AC power circuit, which can control the light 160, and any attached appliances such as TV 162 or PC 164 via local control such as a switch or local intranet PC 164 or by remote control via the Internet connection 115. The wired communication technology can be Ethernet, HomePNA™ (HomePNA Working Group) or any other wired Internet/Intranet technology. Also, the wired attachment to the Intranet can use the same wires as the electrical power. This communication technology is known as powerline communication.

Figure 5:
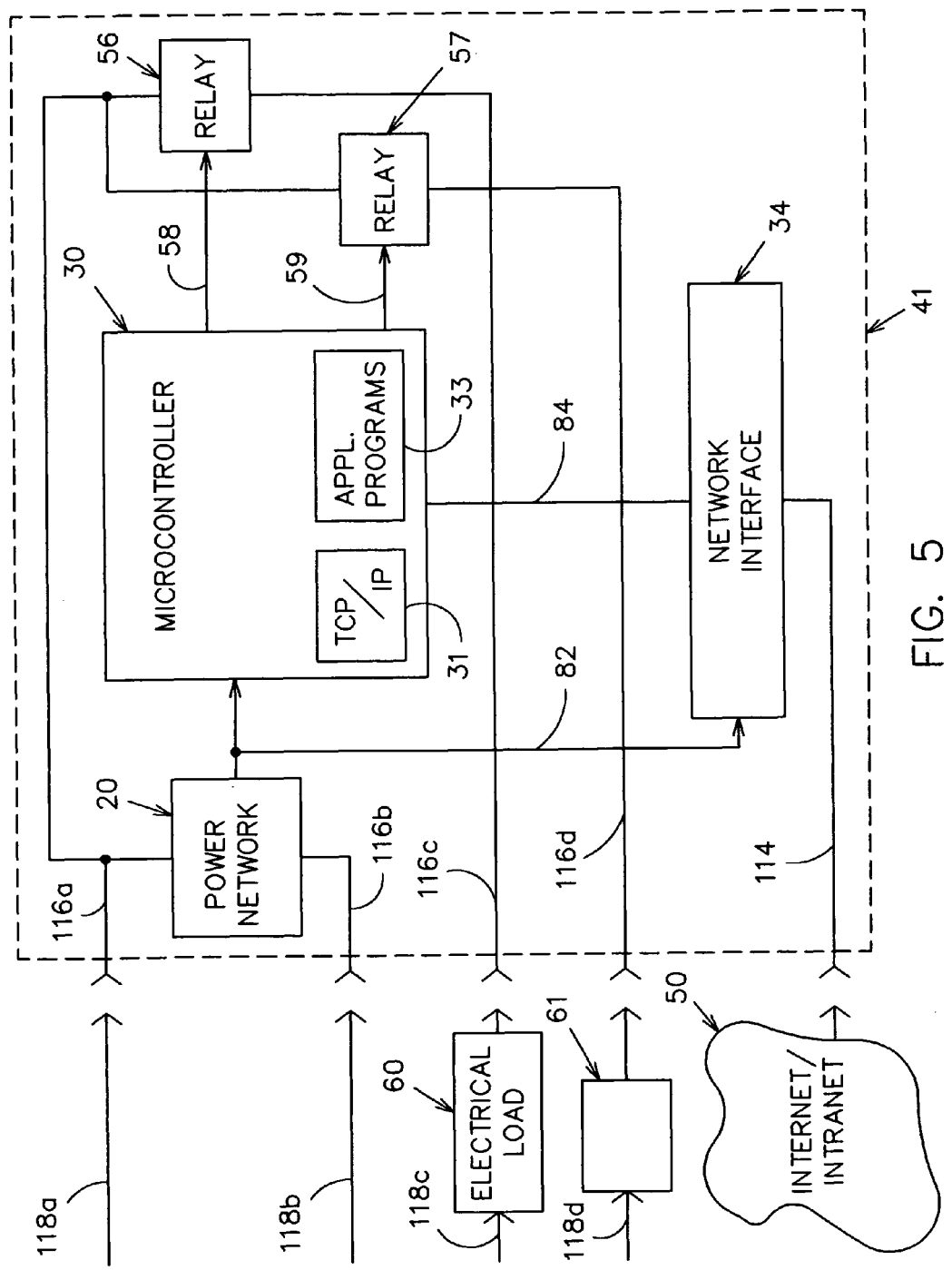
FIG. 5 is a block diagram of the AC power circuit controlling electrical loads.

FIG. 5 shows a block diagram schematic of the AC power circuit 41 in which AC power from AC source 118a, 118b, 118c, and 118d is applied to the AC power circuit 41 and electrical loads 60 and 61. The AC power circuit 41 is connected to the Internet/Intranet 50 via communication connection 114. In addition to the power network 80, the microcontroller 30, and network interface 34, the microcontroller 30 via lines 58 and 59 controls relays 56 and 57, which supplies AC power to an electrical load 60 via line 116c and to electrical load 61 via 116d. In this embodiment, the AC power circuit 41 can control the electrical loads 60 and 61 by the Internet/Intranet 50. The AC power circuit 41 would be incorporated in an electrical box that uses parallel connections to the AC power source lines 118a and 118b which connects to lines 116a and 116b, respectively, of the AC power circuit. Typical applications for the AC power circuit 41 would be a switch box with both power lines available or an electrical outlet box.

Figure 6:
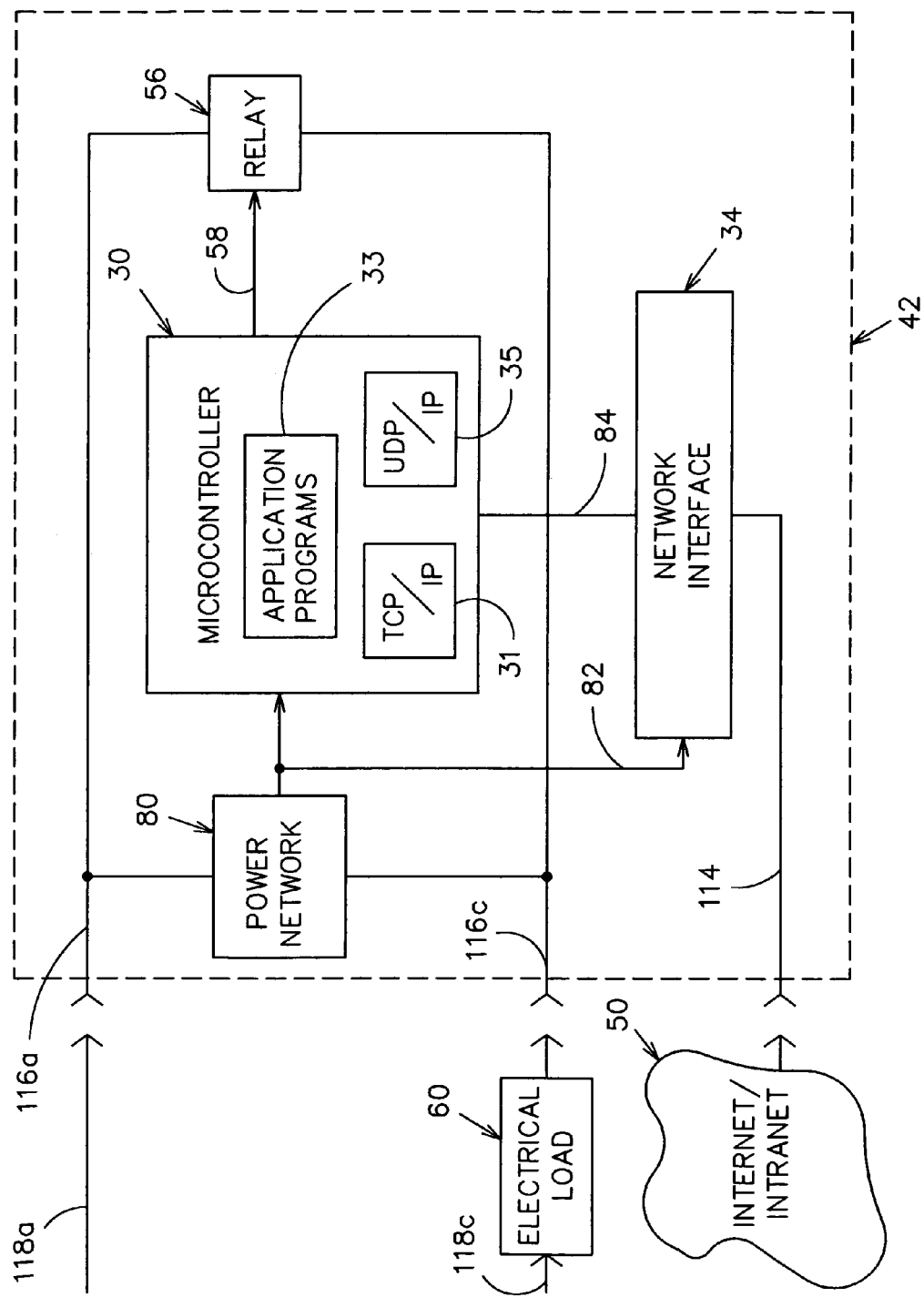
FIG. 6 is a block diagram of the AC power circuit controlling an electrical load in a series AC configuration.

FIG. 6 shows a block diagram schematic of the AC power circuit 42 in which AC power from AC source 118a and 118c is applied to the AC power circuit 42 and the electrical load 60. The AC power circuit 42 is connected to the Internet/Intranet 50 via communication connection 114. The AC power circuit 42 contains the power network 80, the microcontroller 30, the network interface 34, and relay 56. The AC power circuit 42 is attached to the AC power lines 118a and 118c in series with the electrical load 60 via line 116c. Typical applications for the AC power circuit 42 would be in switch boxes that only have series connections to the electrical load. This is common in older homes.

Figure 7:
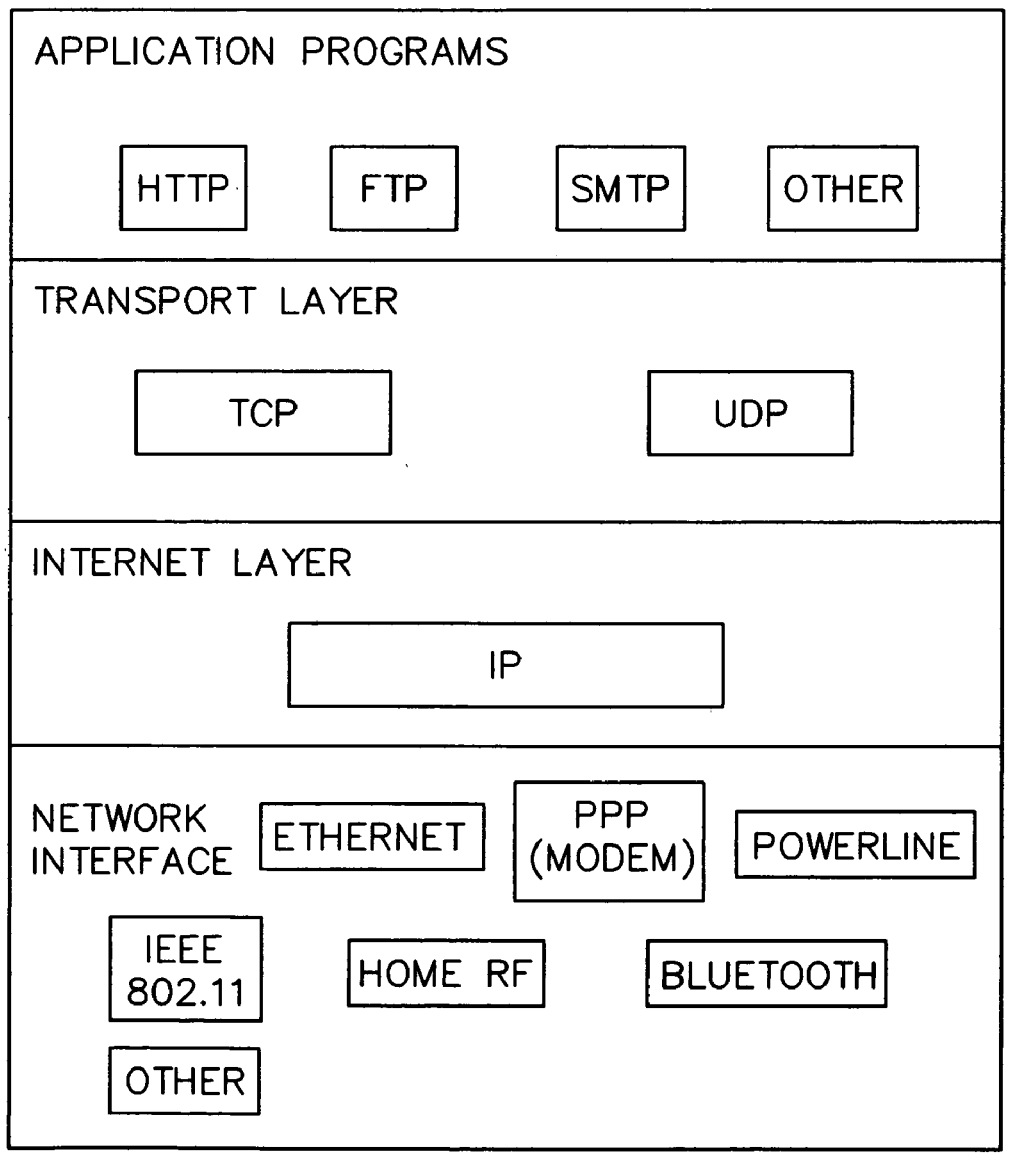
FIG. 7 is a diagram of the Internet Stack using UDP and TCP as the transport protocols, the IP as the network protocol, and illustrating the data link layer protocol such as Ethernet, PPP, and the application layer such as HTTP server, or SMTP e-mail.

The microcontroller 30 in the AC power circuits 40, 41, and 42 has the Internet stack (TCP/UDP/IP) 31 and application programs 33. FIG. 7 shows the software layers that illustrate the Internet stack 31 and application programs 33 contained in the microcontroller 30. FIG. 7 also shows the network interface and some possible communication protocols such as Ethernet, PPP (phone line), powerline, IEEE 802.11, HomeRF™, and Bluetooth™. The microcontroller 30 can contain one or more possible applications such as Hyper-Text Transfer Protocol (HTTP) server, File Transport Protocol, FTP, capability, Simple Mail Transport Protocol, SMTP, capability, and others. The microcontroller 30 can contain the TCP/IP stack or UDP/IP stack, or a combination depending on the application program as illustrated in FIG. 7.

Figure 8:
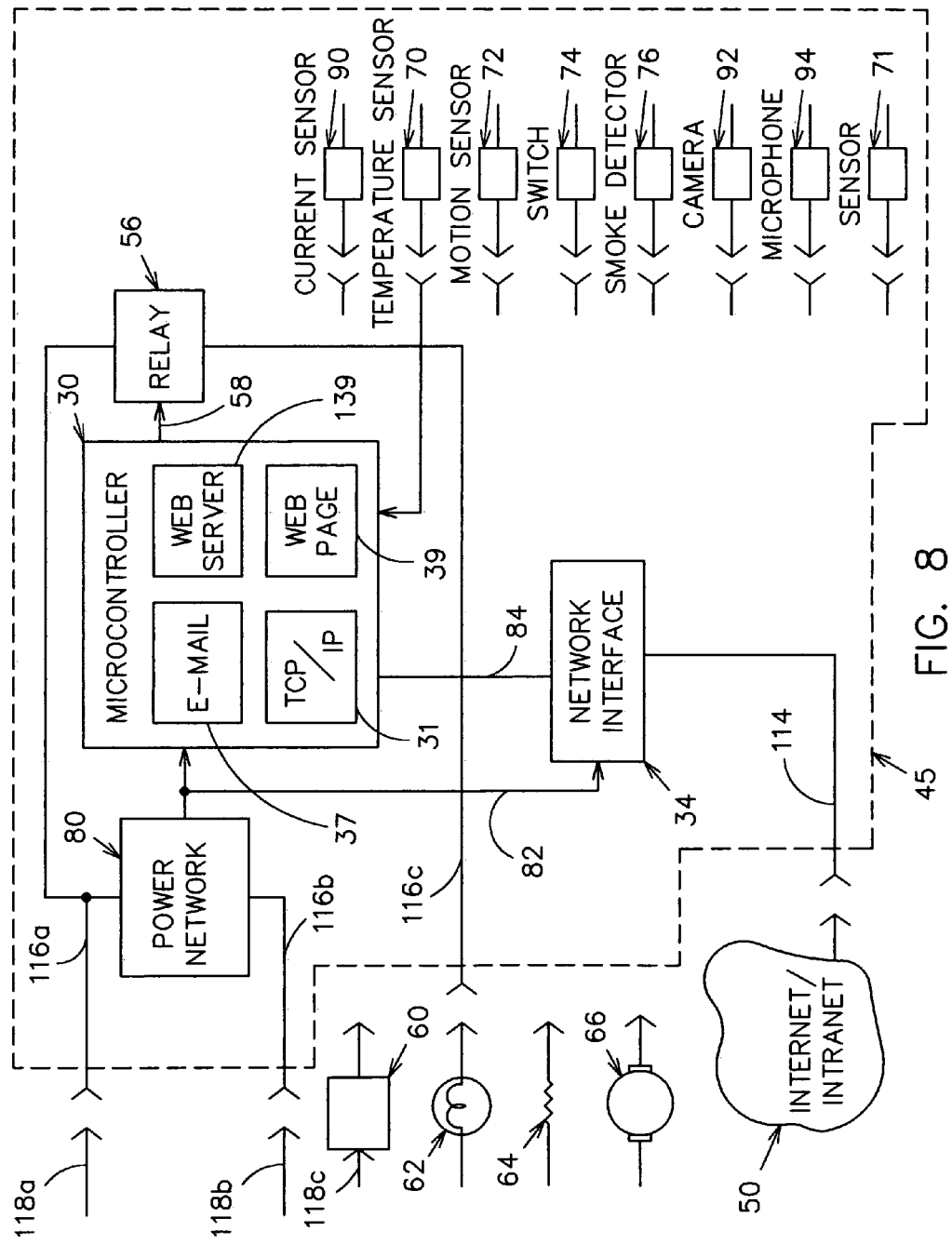
FIG. 8 is a block diagram of the AC power circuit showing some possible application programs run on the microcontroller that control some electrical loads and/or receive information from sensors.

FIG. 8 shows a block diagram schematic of the possible configurations to the AC power circuit 45. The AC power circuit 45 can control different electrical loads such as a light 62, a heater 64, an electrical motor 66, or any other electrical appliances 60.

The microcontroller 30 that is contained in the AC power circuit 45 can run an e-mail application program 37 that sends out information upon some condition. For example, if the motion sensor 72 detects some movement in an area or smoke detector 76 indicates a fire, an e-mail can be sent to alert the proper agency for assistance.

The microcontroller 30 can run a web server application 139 with a web page 39. The web server application 139 receives HTTP commands through the network interface 34 that specifies a predetermined Internet Protocol, IP, number for the AC power circuit 45. Web clients to read information from the AC power circuit 45 such as the status of the AC power to the electrical load may use the HTTP commands. HTTP commands may also be used to transfer information to the AC power circuit 45 such as information that controls the electrical load or sensors.

In response to an HTTP request, the AC power circuit web server application 139 generates a web page 39 that specifies interactions to the attached electrical load and sensors. The web page 39 is a Hypertext Markup Language, HTML, formatted page or an eXtensive Markup Language, XML, formatted page. The network interface 34 transfers the web page 39 to the web client that requested the information via the Internet/Intranet 50.

FIG. 8 also shows various connected sensors to the microcontroller 30 such as current sensor 90 for monitoring the electrical power used by the electrical load, a temperature sensor 70 for indicating the indoor or outdoor temperature of the room, a motion sensor 72 to detect movement within the room, a switch 74 for locally activating the AC power to the load, a smoke detector 76 to detect the presence of a fire, a camera 92 to provide observations in the room, a microphone 94 to monitor the audio within the room, and many other types of sensors 71. The microcontroller 30 can be programmed to communicate to other AC power circuits in other electrical boxes to allow multiple actions to occur upon a sensor detecting a condition. For example, the microcontroller 30 can be programmed to detect movement within the room by the motion sensor 72 in one electrical box to activate lights in other electrical boxes within the house via the home Intranet. In addition, the microcontroller 30 can be programmed to send an e-mail to the owner or monitoring company that someone is present in the home.

Figure 9:
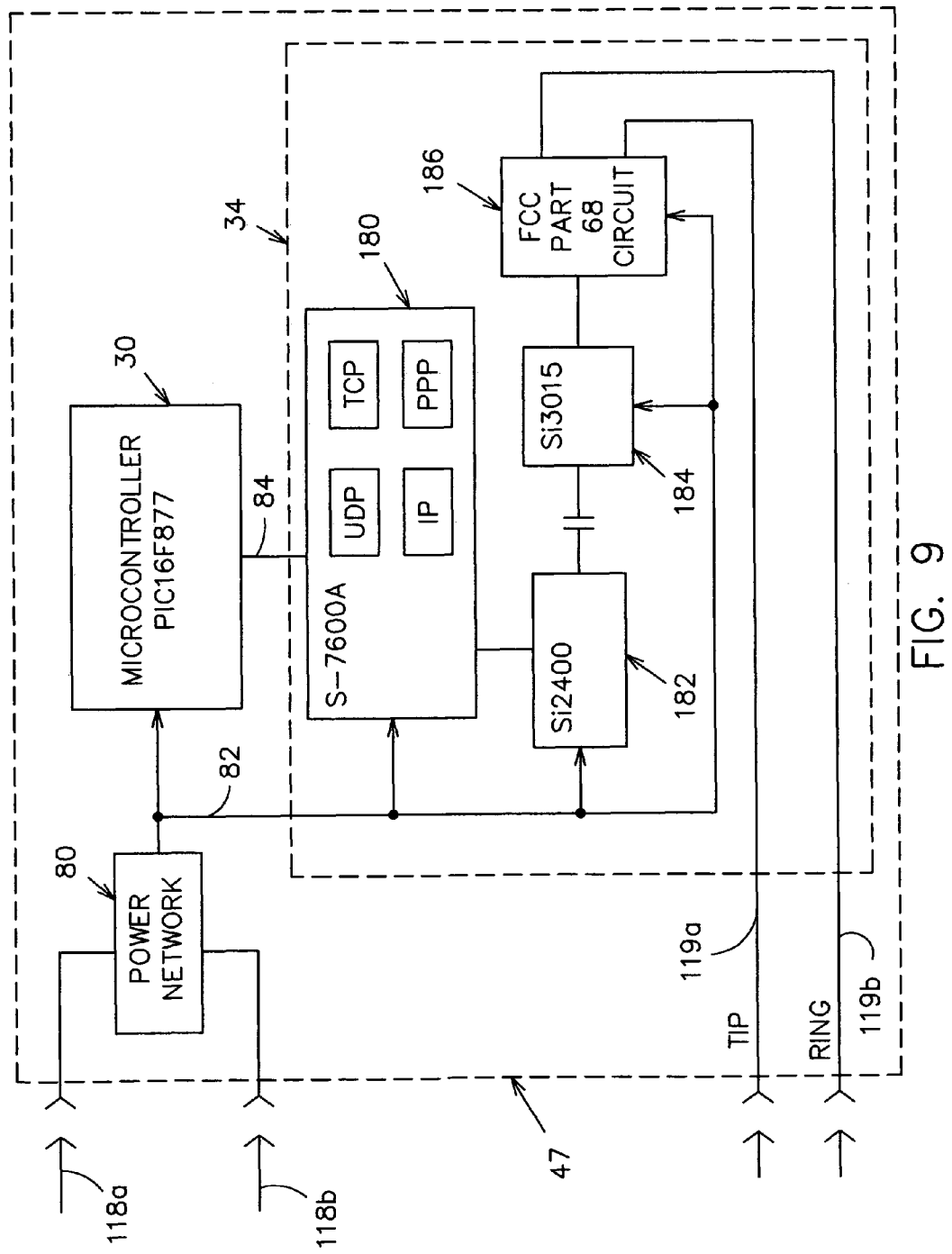
FIG. 9 is a block diagram of the AC power circuit showing that the TCP/IP stack in the network interface block and attached to the home Intranet via the phone lines.

In another embodiment, the network interface 34 contains the TCP/IP and UDP/IP stacks instead of the microcontroller 30. FIG. 9 shows an embodiment of the AC power circuit 47 with TCP/IP contained in the network interface 34. This embodiment uses a commercially available integrated chip 180 that is denoted as S-7600A made by Seiko Instruments, Inc. The power network 80 provides the necessary low voltage power for supplying the various integrated circuits. In this embodiment, the AC power circuit 47 is attached to the home Intranet various phone lines 119a and 119b. The Internet modem chipset 182 and 184 that communicates between the integrated chip 180 to the phone lines are from Silicon Laboratories, and are denoted as Si2400 and Si3015. The modem chipset 182 and 184 provides connect rates of up to 2400 bps, full duplex over the telephone lines. Other modem chipsets can provide higher data rates. Block 186 provides the necessary circuits to interface to the phone lines according to the FCC part 68 specifications.

Figure 10:
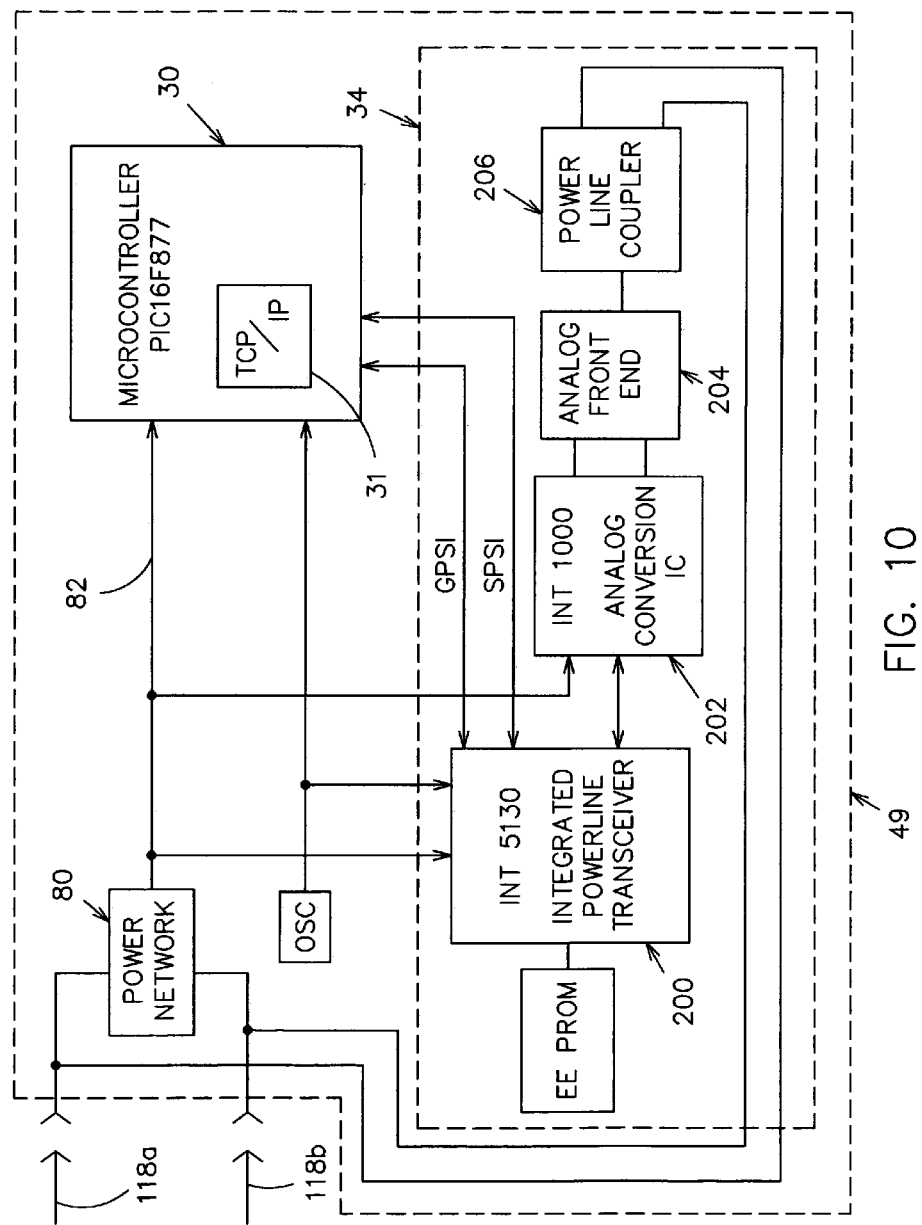
FIG. 10 is a block diagram of the AC power circuit connected to the home Intranet via the power lines.

In another embodiment, the network interface 34 is connected to the home Intranet via the power lines. FIG. 10 shows this embodiment where the AC power circuit 49 connects to the home Intranet via electrical power lines 118a and 118b. The network interface contains powerline chipset 200 and 202 from Intellon and is denoted as INT 5130, an integrated powerline transceiver, and INT1000, an analog conversion integrated circuit. The powerline chipset 200 and 202 are connected to the electrical power lines 118a and 118b via the analog front end 204 and the power line coupler 206. The Internet stack is in the microcontroller 30. The microcontroller 30 in FIG. 10 is a Microchip PIC16F877.

Figure 11:
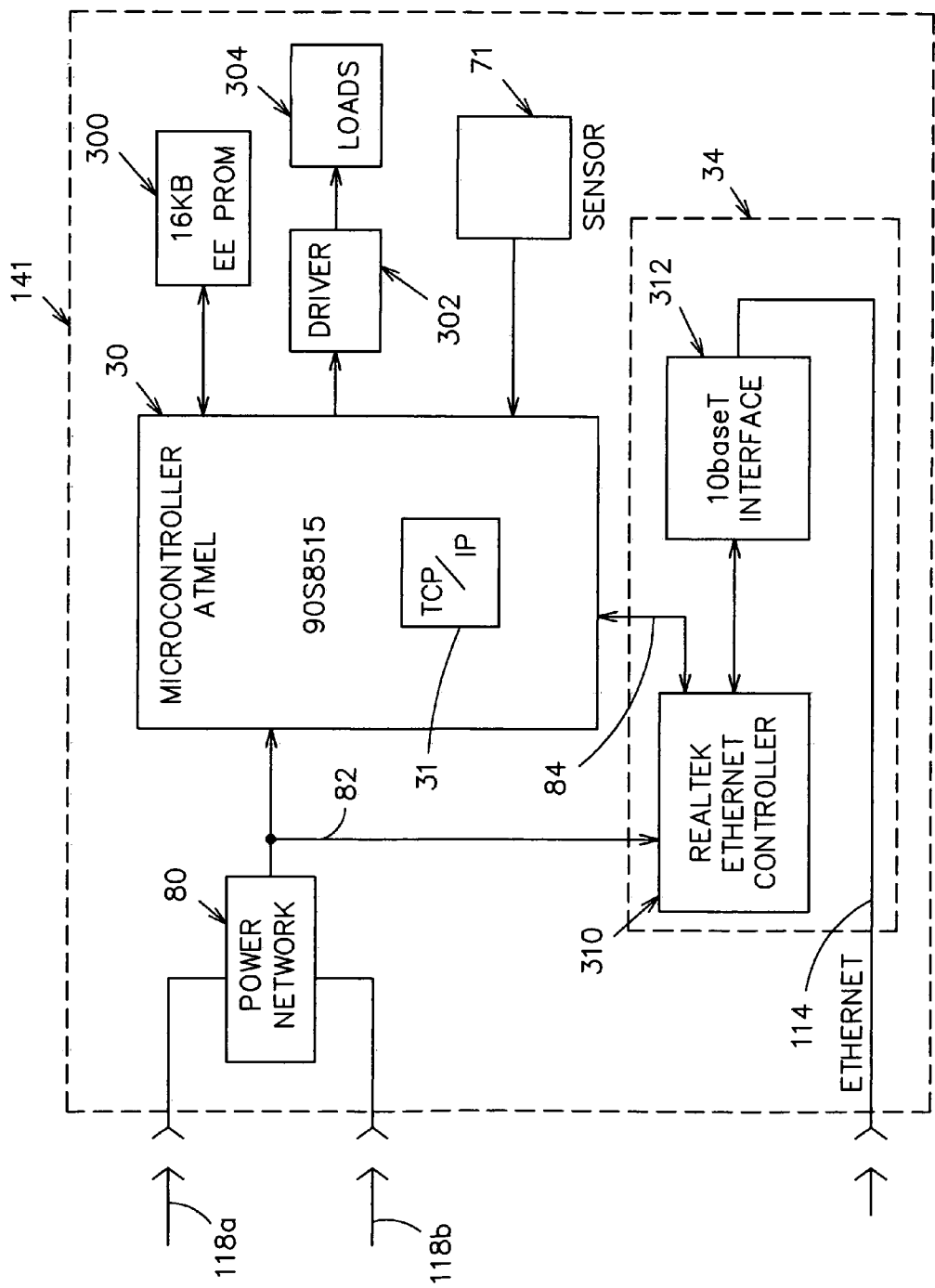
FIG. 11 is a block diagram of the AC power circuit connected to the home Intranet using a wired Ethernet connection.

FIG. 11 shows another embodiment where the AC power circuit 141 is connected to the home Intranet via an Ethernet cable 114. In this embodiment, the microcontroller 30 is an Atmel 90S815 and has memory 300 that is external to the microcontroller 30 for storing a web page. In addition, microcontroller 30 controls loads 304 via a driver 302. Sensors 71 are connected in this embodiment. The network interface 34 uses a Realtek Ethernet Controller 310 and interfaces to the home Intranet cable using 10baseT Interface 312.

Figure 12:
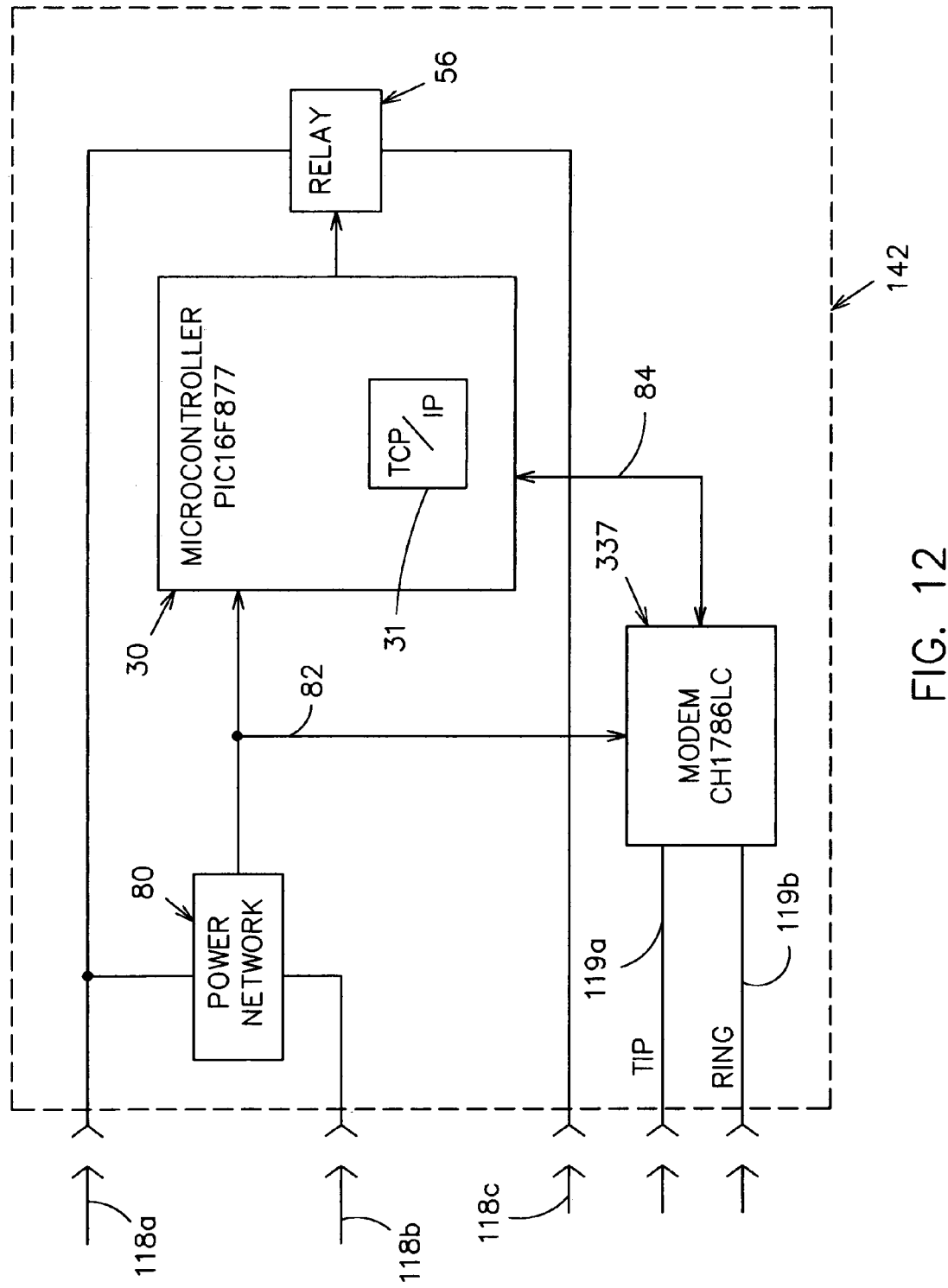
FIG. 12 is a block diagram of the AC power circuit connected to the phone lines and controls an electrical load.

FIG. 12 shows another embodiment where the AC power circuit 142 is connected to the Intranet via the phone lines 119a and 119b via modem module 337. The modem module 337 is a Cermetek CH1786LC. The microcontroller 30 is a Microchip PIC16F877 and has software, which implements the TCP/IP stack. In this embodiment, the microcontroller 30 is programmed to control the relay 56 to supply power to an electrical load attached to line 118c. A web client or device attached to the Intranet/Internet can control the relay 56 via the Intranet/Internet.

Figure 13:
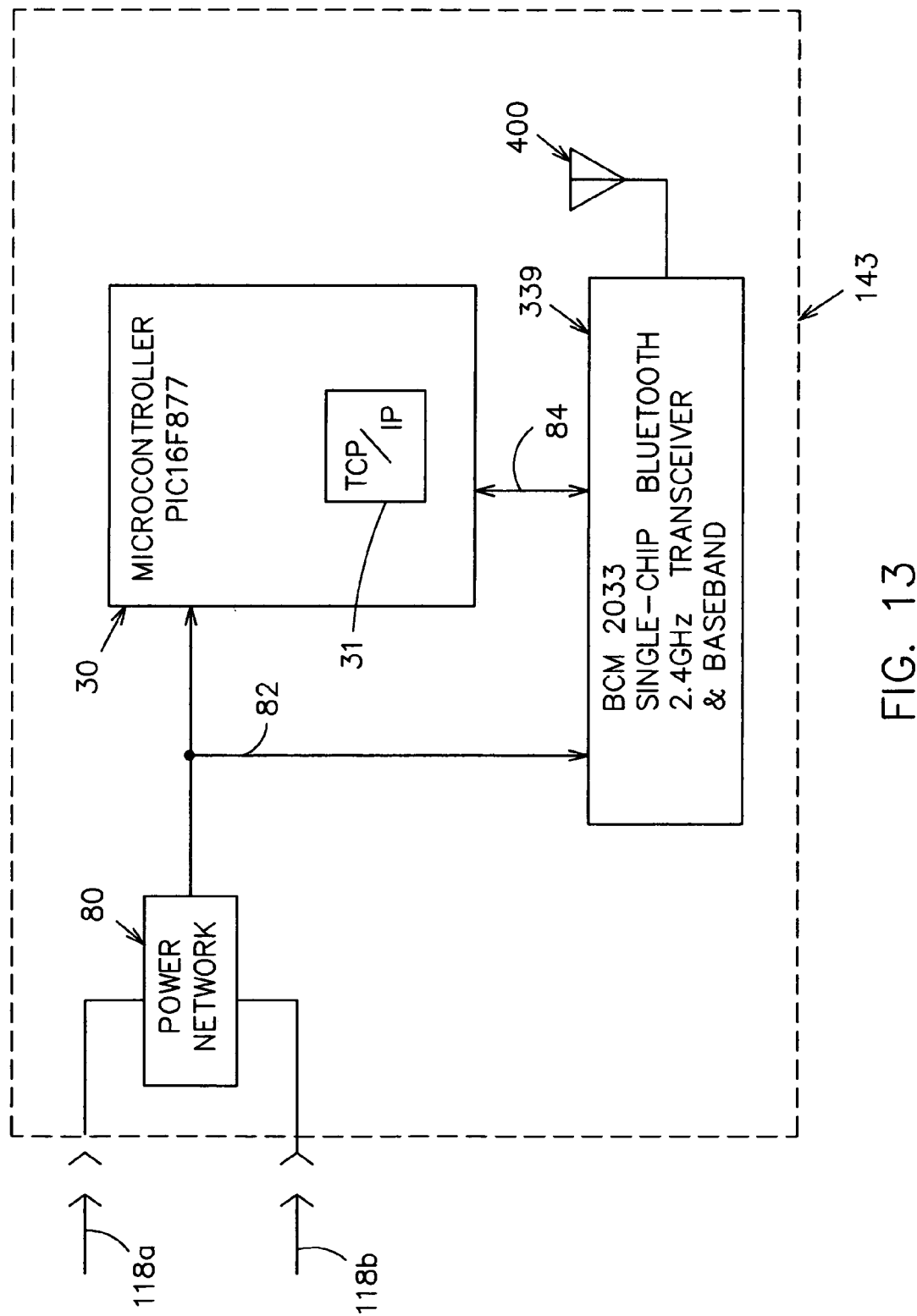
FIG. 13 is a block diagram of the AC power circuit connected wirelessly to the home Intranet using Bluetooth™.

FIG. 13 shows another embodiment where the AC power circuit 143 is connected to the home Intranet via a wireless connection 400. A single-chip Bluetooth™ transceiver 339 is the network interface connection to the home Intranet. The transceiver 339 in this embodiment is a Broadcom BCM2033 and provides short-range communication with PCs, laptops, PDAs, peripheral devices, and embedded devices.

Figure 14:
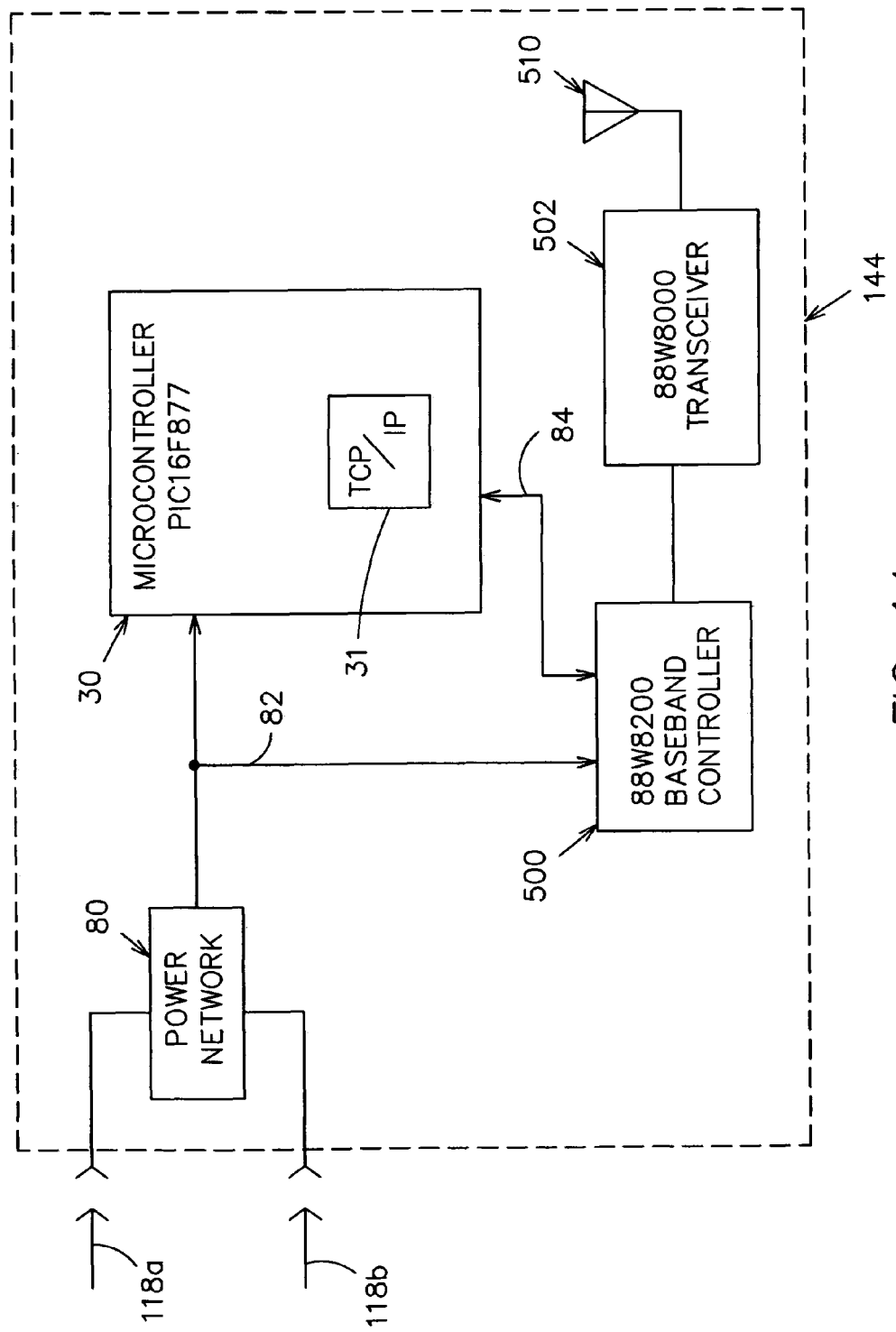
FIG. 14 is a block diagram of the AC power circuit connected wirelessly to the home Intranet using wireless Ethernet, IEEE 802.11.

FIG. 14 shows another embodiment where the AC power circuit 144 is connected to the home Intranet via a wireless connection 510. The wireless chipset 500 and 502 used Marvell 88W8200 baseband controller and Marvell 88W8000 transceiver to form an IEEE 802.11 wireless connection.

Figure 15:
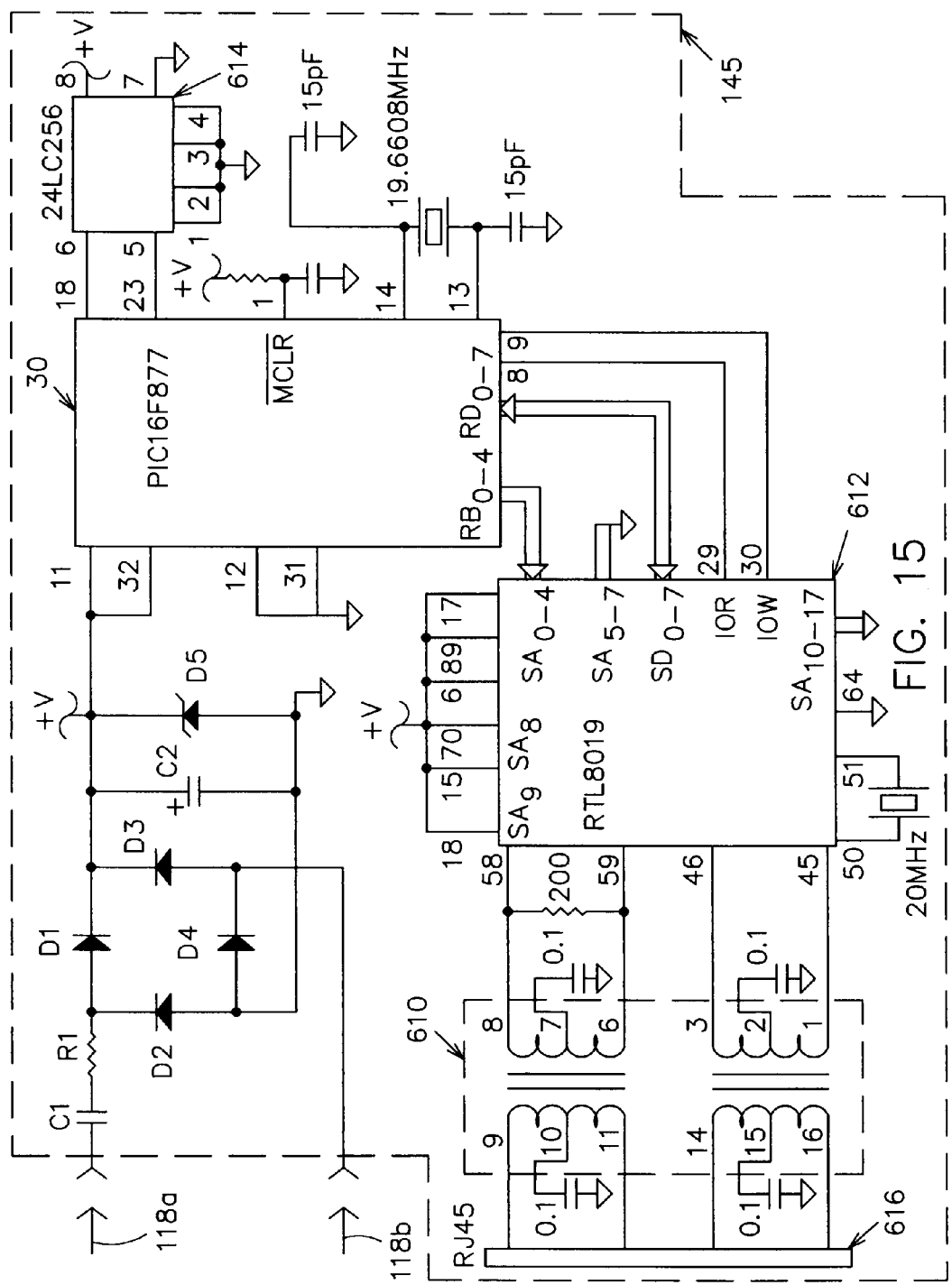
FIG. 15 is a schematic of one implementation of the AC power circuit that is connected to the home Intranet via a wired Ethernet connection.

FIG. 15 shows another embodiment where the AC power circuit 145 is connected to the home Intranet via a wired Ethernet connection 616. FIG. 15 shows a schematic of the circuitry that implements this embodiment. The AC power lines 118a and 118b provide electrical power to the circuit. Capacitor C1 drops the high voltage AC to low voltage AC. Diodes D1-D4 convert the AC power to DC power. Capacitor C2 acts a filter capacitor and diode D5 limits the DC supply. The microcontroller 30 interfaces with the EEPROM 614 and the Ethernet Controller IC 612. As show in the FIG. 15, the microcontroller 30 in this schematic is a Microchip PIC16F877 and the Ethernet controller 612 is a Realtek RTL8019. The microcontroller 30 is programmed to act as a web server with the web page stored in EEPROM 614. The microcontroller 30 communicates to the home Intranet and the Internet through the wired Ethernet connection 616. The coil 610 isolates the home wired Intranet from the Ethernet controller 612. In this embodiment, the AC power circuit 145 acts a web server.

Figure 16:
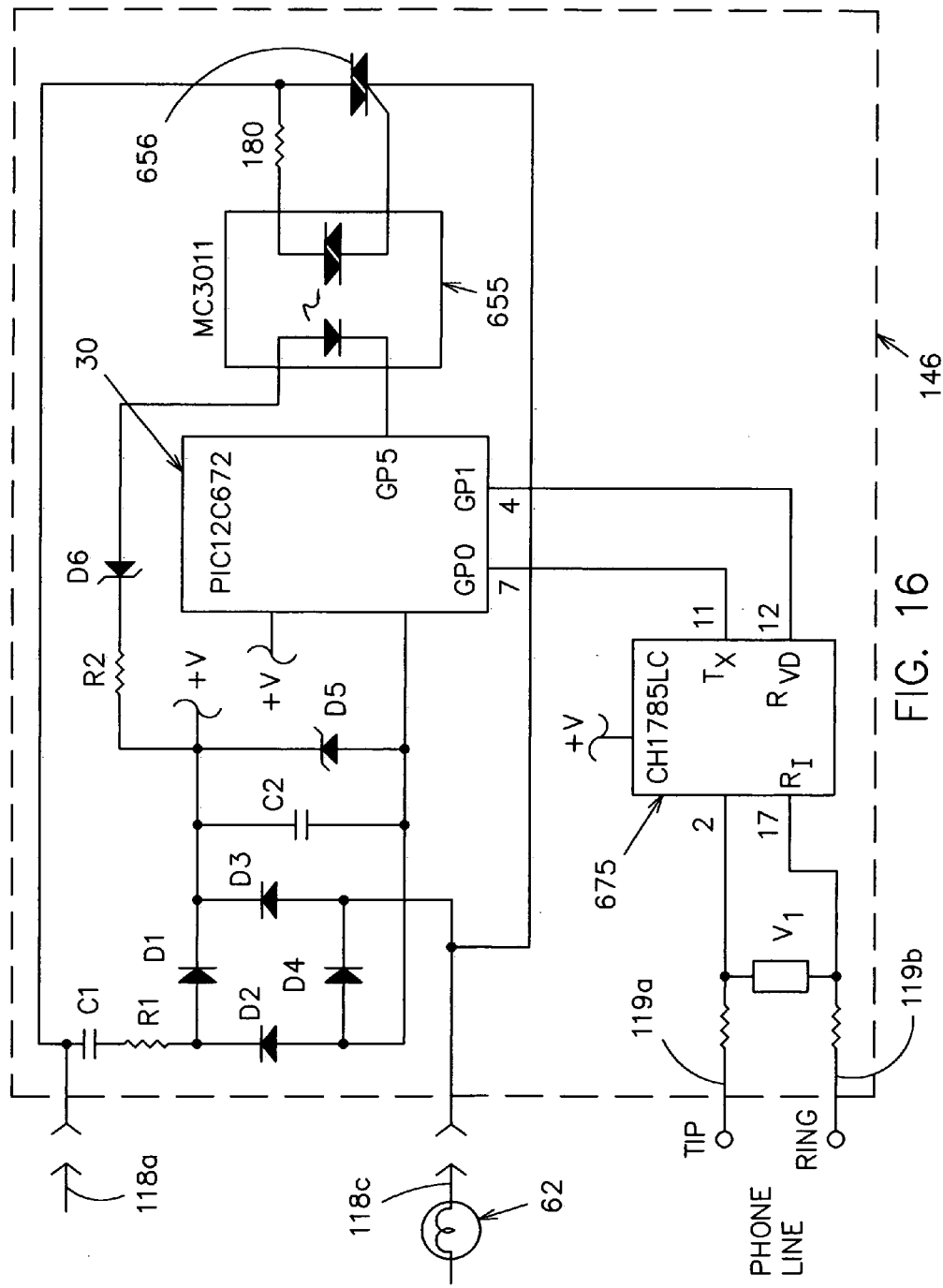
FIG. 16 is a schematic of an implementation of the AC power circuit that is connected to the phone lines and controls an electrical load in series with the circuit.

FIG. 16 shows another embodiment where the AC power circuit 146 is connected to the home Intranet via a wired phone line connections 119a and 119b. FIG. 16 shows a schematic of the circuitry that implements this embodiment. In this embodiment, the AC power circuit 146 controls an electrical load such as a light 62. This is a single wire connection to the electrical load. In this embodiment, the power network that is made up of capacitor C1, resistor R1, diodes D1-D4, capacitor C2, and zener diode D5 supplies low voltage power to the microcontroller 30 and the modem module 675. The power network steals a portion of the AC power for powering the circuitry. Triac 656 controls the power to the electrical load when activated by the microcontroller 30 via the triac driver 655.

Figure 17A:
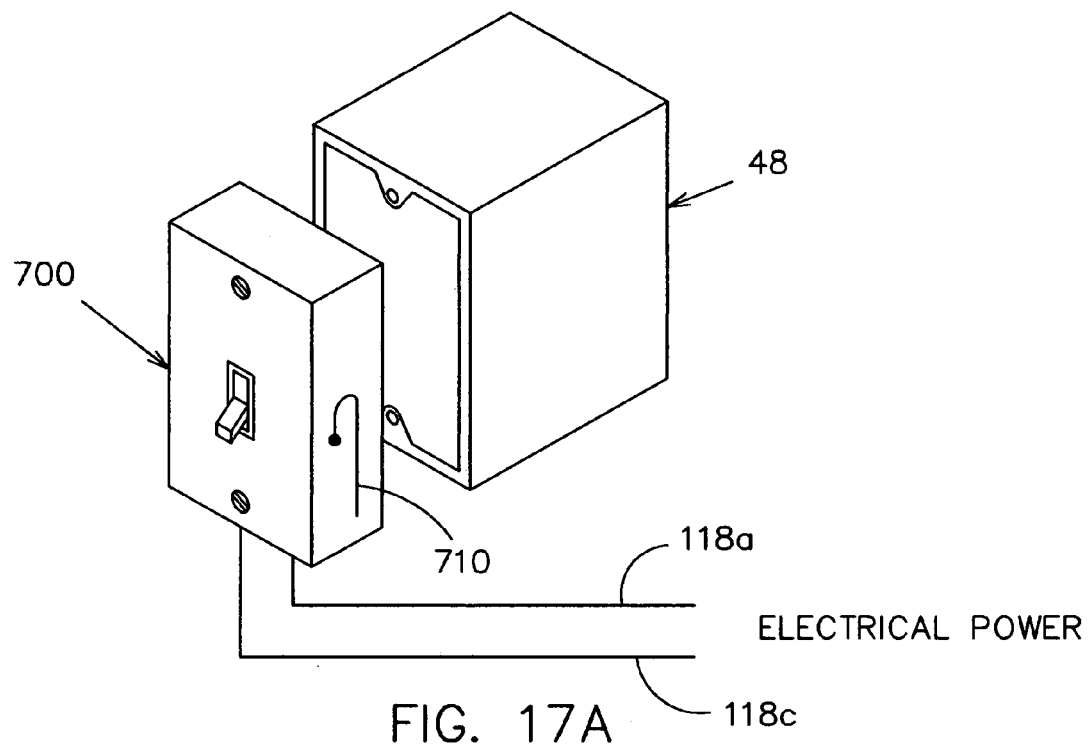
FIG. 17A is an installation of the integrated AC power circuit with an electrical switch within an electrical box with a wireless connection to the home Intranet.
Figure 17B:
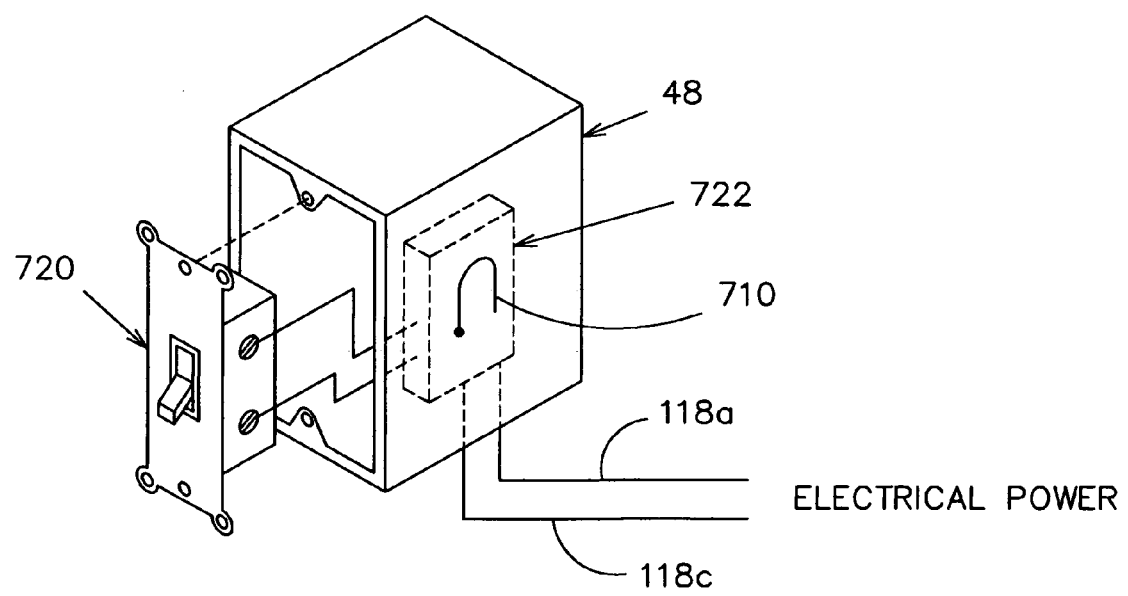
FIG. 17B is an installation of the AC power circuit and an electrical switch within an electrical box with a wireless connection to the home Intranet.

FIGS. 17A and 17B show two alternative installations of the AC power circuit with a electrical switch and both installations uses a wireless connection 710 to the home Intranet and installed in the electrical box 48. In FIG. 17A, the switch is integrated with the AC power circuit and forms a standalone switch module 700. In FIG. 17B, the switch 720 is not integrated in the AC power circuit 722. FIG. 17A shows the installation of the switch module 700 into the electrical box. FIG. 17B shows the installation of the standard electrical switch 720 and the AC power circuit 722 into the electrical box 48. In both cases the AC electrical power supply is provided by lines 118a and 118c.

Figure 18A:
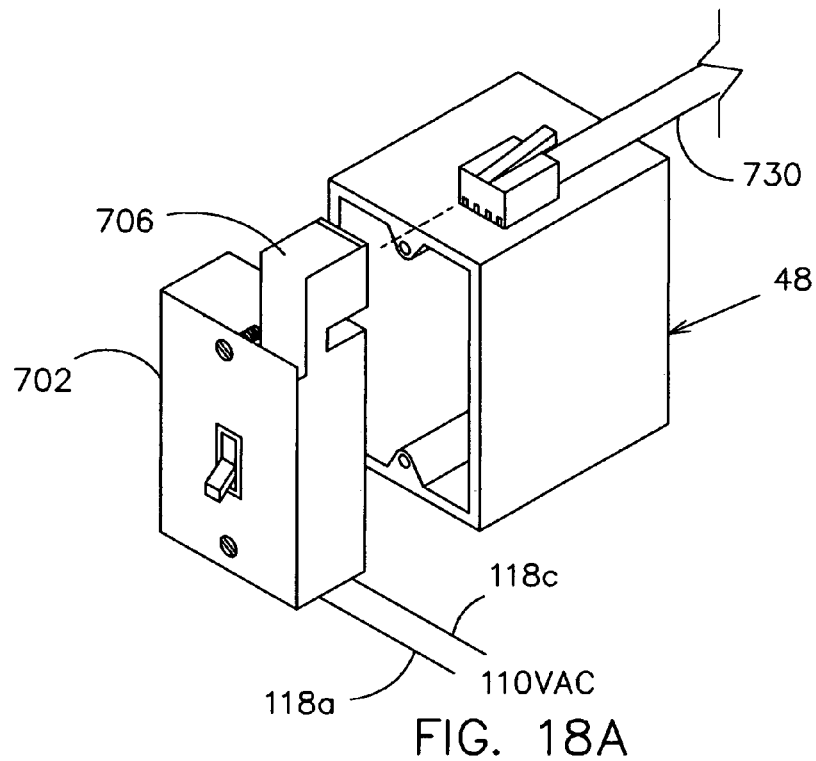
FIG. 18A is an installation of the integrated AC power circuit with an electrical switch within an electrical box with a wired connection to the phone or Ethernet.
Figure 18B:
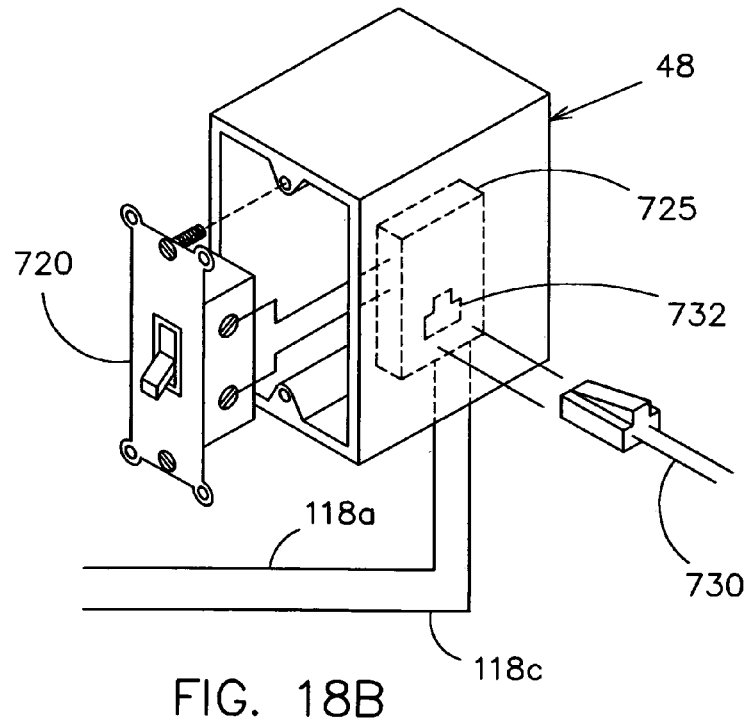
FIG. 18B is an installation of the AC power circuit with an electrical switch within an electrical box with a wired connection to the phone or Ethernet cable.

FIGS. 18A and 18B show two alternative installations of the AC power circuit with an electrical switch and both installations use a wired connector 730 to home Intranet and are installed in the electrical box 48. In FIG. 18A, the switch is integrated with the AC power circuit and forms a standalone switch module 702. In FIG. 18B, the switch 720 is not integrated in the AC power circuit 725. FIG. 18A shows the installation of the switch module 702 into the electrical box 48 and how the switch module 702 attaches to the home Intranet via connector socket 706. The connector socket 706 slides over the electrical box 48. The home Intranet cable 730 connects to the socket 706. FIG. 18B shows the installation of the standard electrical switch 720 and the AC power circuit 725 into the electrical box 48. The home Intranet cable 730 connects to AC power circuit 725 via the socket 732. In both situations, the AC electrical power supply is provided by lines 118a and 118c.

Figure 19A:
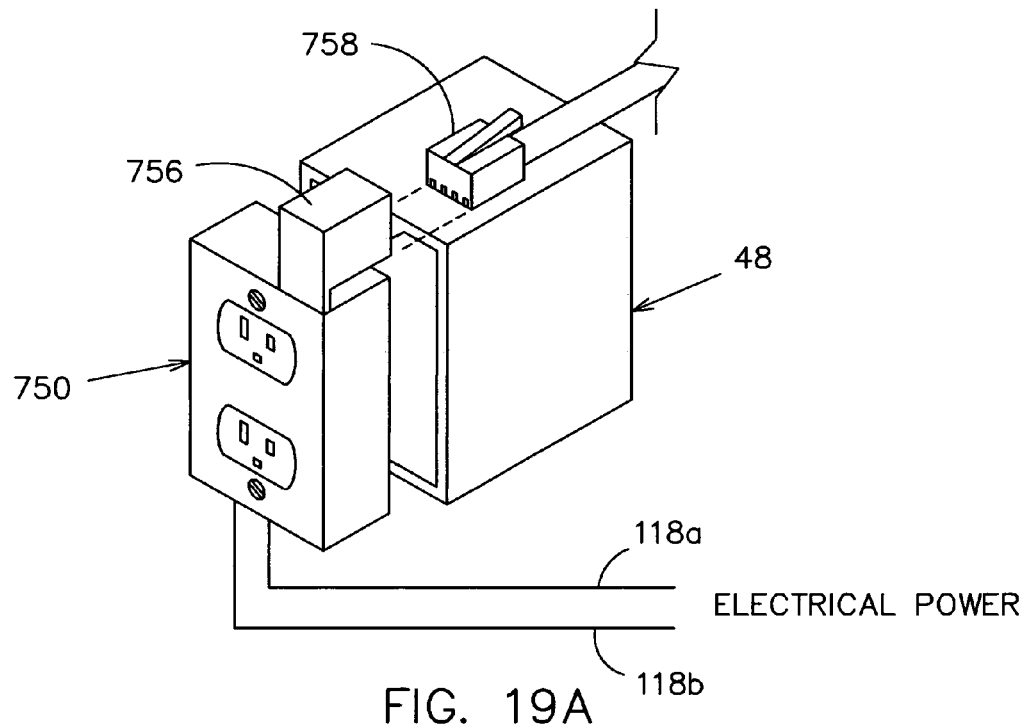
FIG. 19A is an installation of the integrated AC power circuit with an electrical receptacle within an electrical box and is connected with a wired connection to the home Intranet.
Figure 19B:
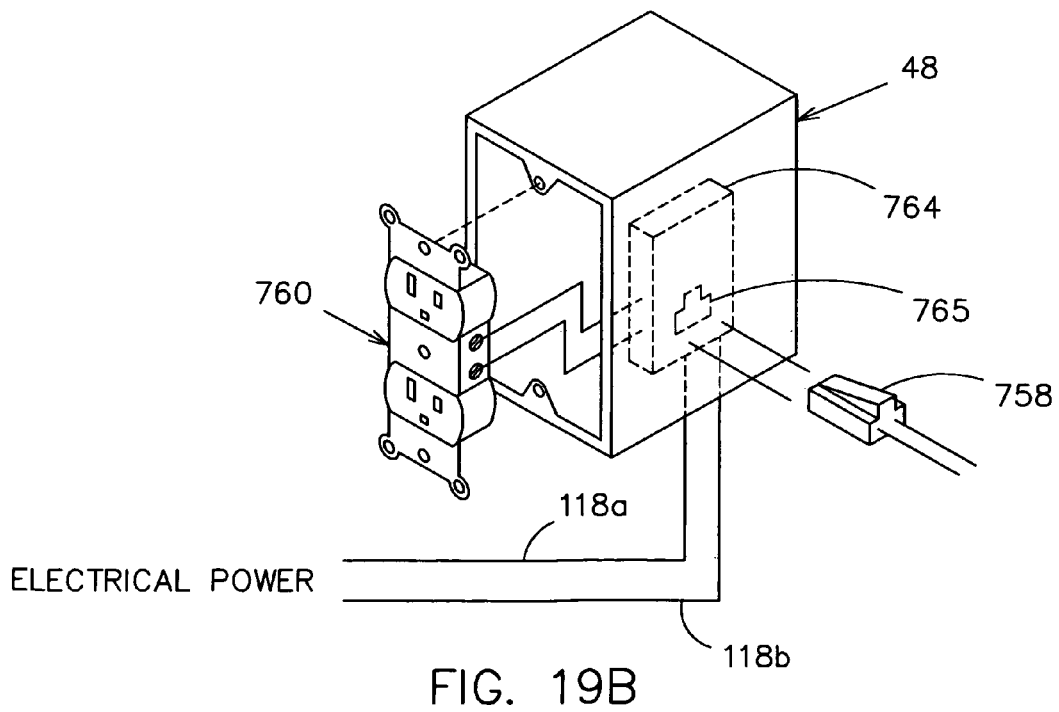
FIG. 19B is an installation of the AC power circuit and an electrical receptacle within an electrical box and is connected with a wired connection to the home Intranet.

FIGS. 19A and 19B show two alternatives installations of the AC power circuit with an electrical receptacle into an electrical box 48. Both installations use wired connections 758 to the home Intranet. In FIG. 19A, the receptacle is integrated with the AC power circuit and forms a standalone receptacle module 750. The connector socket 756 slides over the electrical box 48. The home Intranet cable connects to the socket 756 with a connector 758. FIG. 19B shows the receptacle is not integrated in the AC power circuit 764. FIG. 19B shows the installation of the standard electrical receptacle 760 and the AC power circuit 764 into the electrical box. The connector 758 connects to the AC power circuit 764 via the socket 765. In both schemes, the AC electrical power is provided by lines 118a and 118b.

Figure 20A:
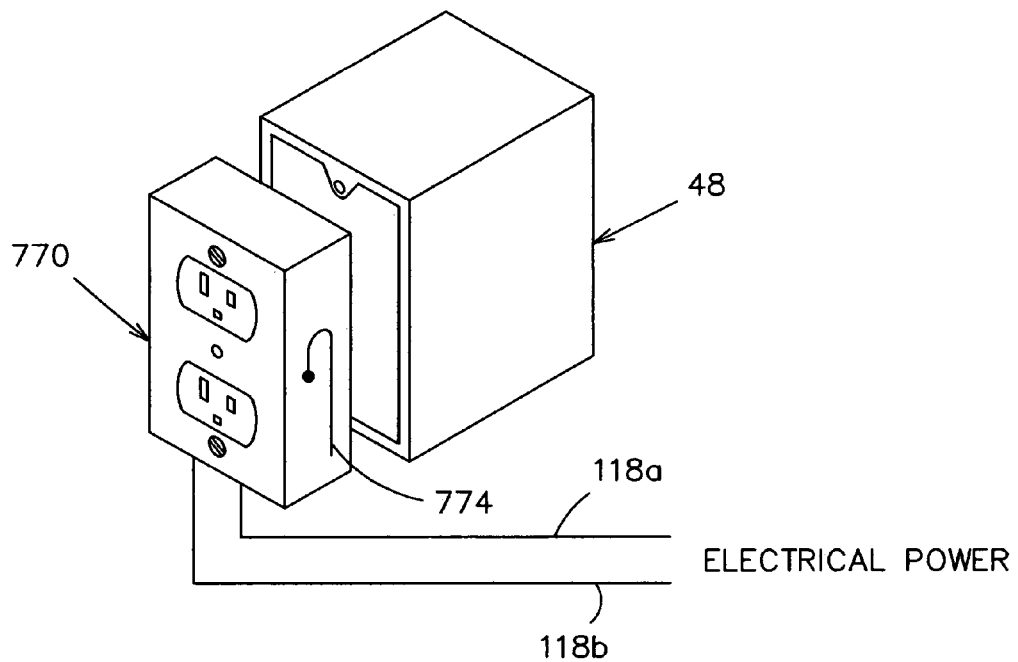
FIG. 20A is an installation of the integrated AC power circuit with an electrical receptacle within an electrical box with a wireless connection to the home Intranet.
Figure 20B:
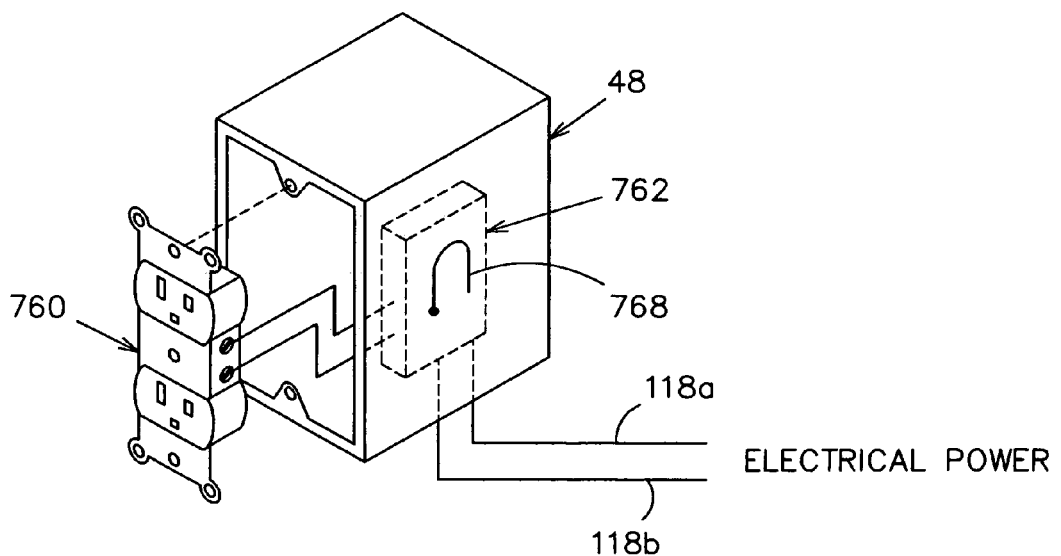
FIG. 20B is an installation of the AC power circuit with an electrical receptacle within an electrical box with a wireless connection to the home Intranet.

FIGS. 20A and 20B show two alternatives installations of the AC power circuit with an electrical receptacle into an electrical box 48 and both installations use wireless connections to the home Intranet. In FIG. 20A, the receptacle is integrated with the AC power circuit and forms a standalone receptacle module 770. The wireless Intranet connection is through the antenna 774. FIG. 20B shows the receptacle is not integrated in the AC power circuit 762. FIG. 20B shows the installation of the standard electrical receptacle 760 and the AC power circuit 764 into the electrical box. The wireless Intranet connection is through the antenna 768. In both schemes, the AC electrical power is provided by lines 118a and 118b.

Figure 21:
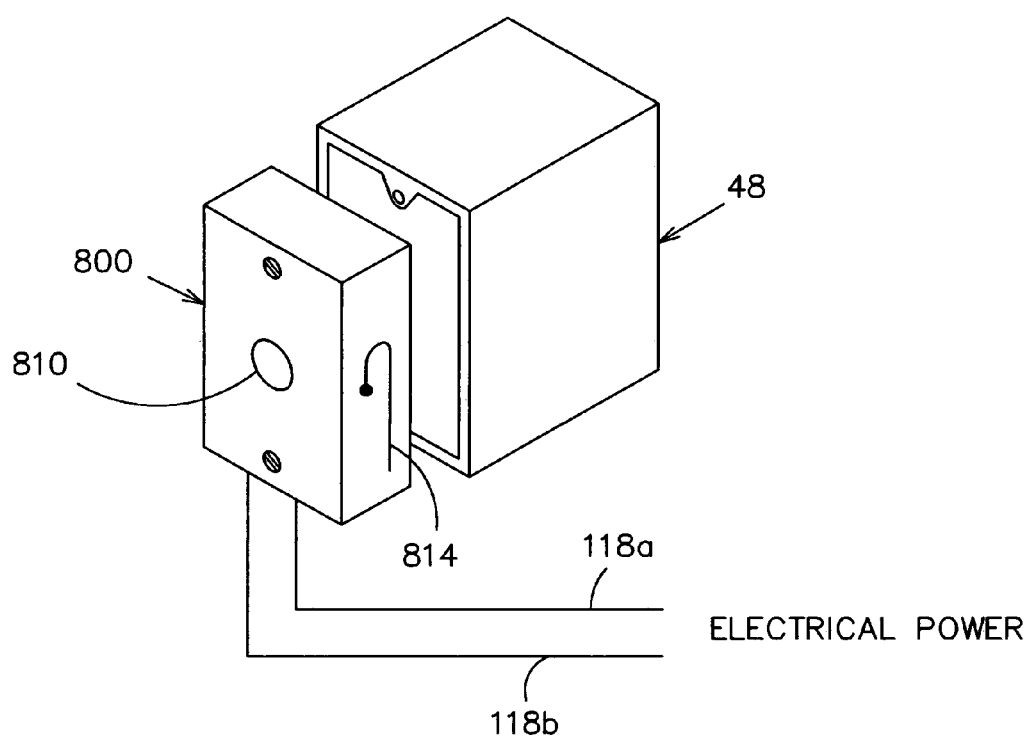
FIG. 21 is an installation of the AC power circuit with a camera sensor installed in the electrical box and is connected wirelessly to the home Intranet.

FIG. 21 shows the installations of the AC power circuit 800 into the electrical box 48. In this configuration, the AC power circuit 800 supports a camera sensor 810 and a wireless Intranet connection via antenna 814. This embodiment would allow monitoring a room via the electrical box 48 installed in the home via the home Intranet web browsers or remote web browsers. One can detect an unwanted guest or monitor the children after school.

Figure 22:
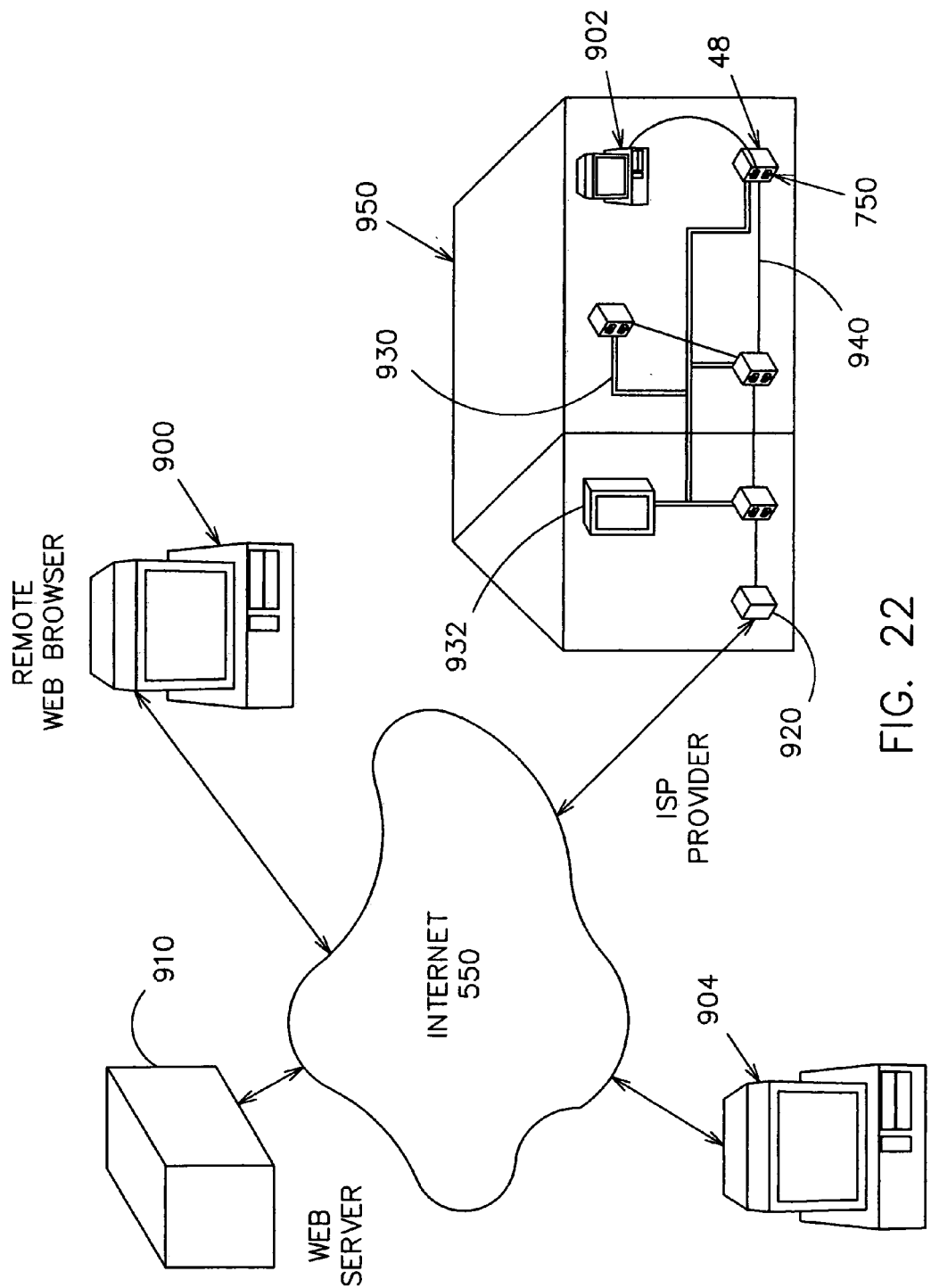
FIG. 22 is an overall diagram showing the home network attached to the electrical boxes with a wired connection and also connected to the world wide Internet.

FIG. 22 shows the connection of many AC power circuits such as AC power circuit 750 via electrical box 48 in a home control and Intranet network 940. The computer 902 can browse the Internet 550 and connect to web server 910 as is typically of today's networks, but also can control or monitor the electrical outlets and switches contain in electrical boxes. The house wiring 930 is showed connected to the central breaker box or house electrical panel 932. Modem 920 is connected to the Internet 550 via an ISP provider. Modem 920 may be built inside the AC power circuit in some embodiments. The remote web browsers 900 can also monitor and control the electrical loads in the home 950 via the Internet 550.

Figure 23:
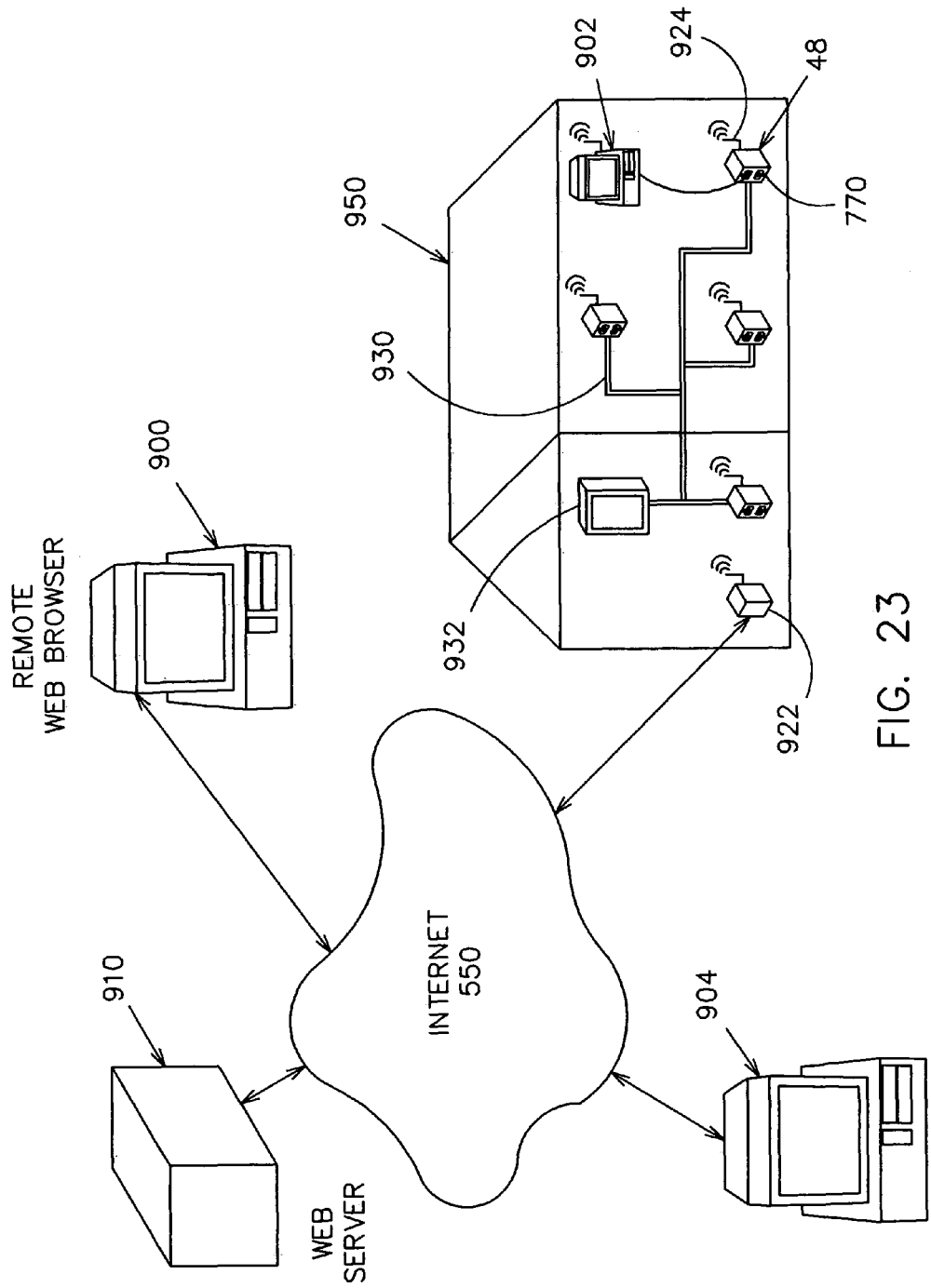
FIG. 23 is an overall diagram showing the home network attached to the electrical boxes with a wireless connection and also connected to the world wide Internet.

FIG. 23 shows the connections of many AC power circuits such as AC power circuit 770 via electrical box 48 in wireless home control and Intranet network 924. The computer 902 can browse the Internet 550 and control the home electrical loads in the home 950.

Figure 24:
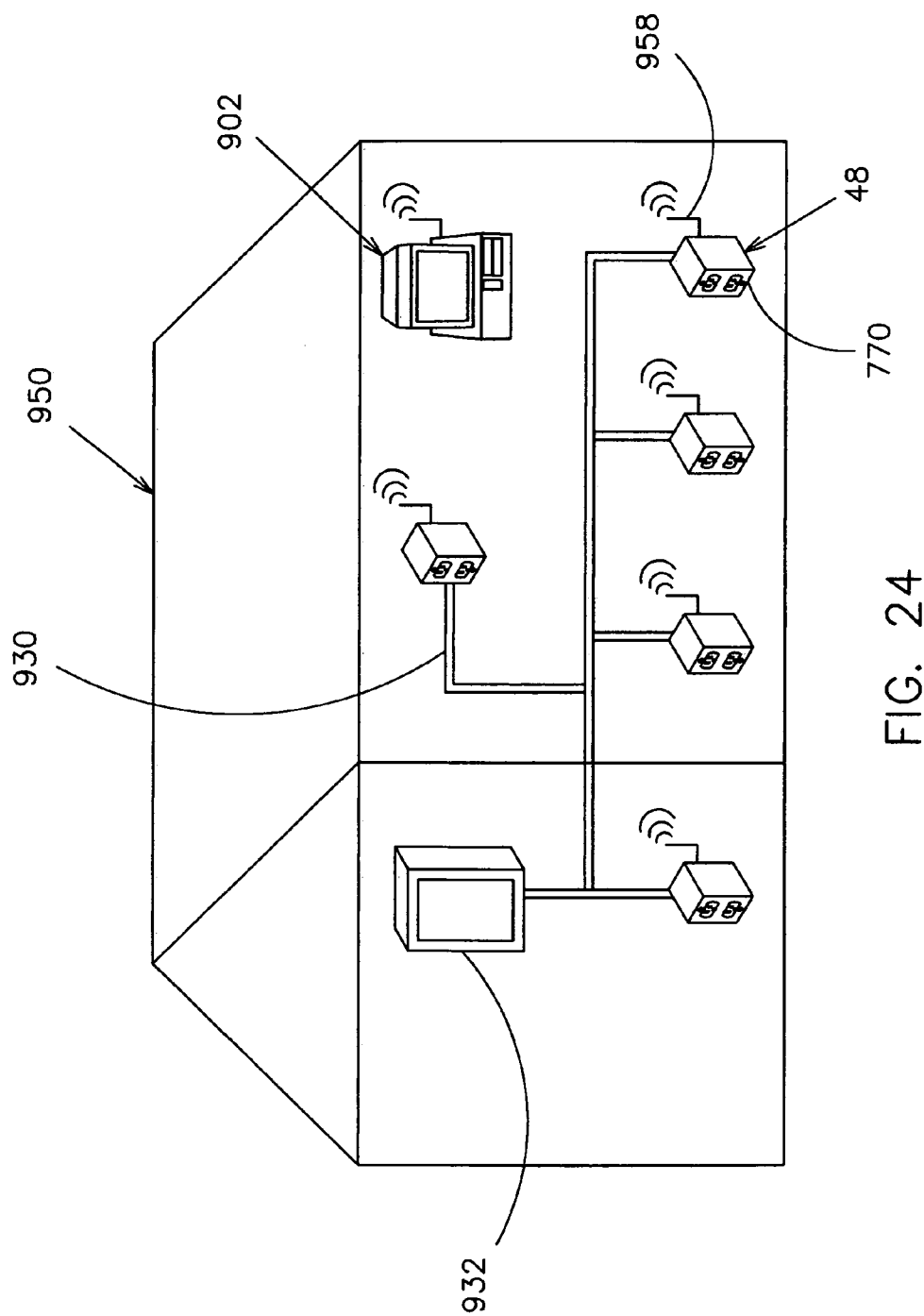
FIG. 24 is an overall diagram showing the wireless home network attached to the electrical boxes.

FIG. 24 shows an embodiment where the home uses the Internet protocol and is not attached to the World Wide Internet. In this embodiment, the home wireless Intranet 958 communicates to the different electrical boxes and personal computer 902. FIG. 24 also shows electrical box 48 that contains the AC power circuit 770.

What is claimed and desired to be secured by Letters Patent of the United States is:

1. An Internet/Intranet-connected AC electrical apparatus, comprising:
   means for extracting power from AC electrical lines;
   means for communicating directly with the Internet using a standard Internet network protocol;
   single housing means, which contains said means for extracting power and said means for communicating, mountable within an electrical junction box; and
   computer means for running one or more programs comprising a web server means that generates an electrical box web page, wherein the web server means comprises means for receiving an HTTP command via the means for communicating with the Internet and for generating an HTML file that defines the electrical box web page in response to the HTTP command, wherein the HTTP command specifies a URL corresponding to the electrical junction box.

2. The Internet/Intranet-connected AC electrical apparatus of claim 1, wherein the standard Internet network protocol is TCP/IP.

3. The Internet/Intranet-connected AC electrical apparatus of claim 1, wherein the standard Internet network protocol is UDP/IP.

4. The Internet/Intranet-connected AC electrical apparatus of claim 1, wherein the HTML file contains a set of information pertaining to the status of sensors attached to the web server.

5. The Internet/Intranet-connected AC electrical apparatus of claim 1, wherein the HTML file contains a set of information pertaining to the control of electrical loads attached to the web server.

6. The Internet/Intranet-connected AC electrical apparatus of claim 1, wherein the HTML file hyperlink to an external web page that specifies additional information.

7. The Internet/Intranet-connected AC electrical apparatus of claim 1, wherein the one or more programs is a Simple Mail Transport protocol means that sends out e-mail.

8. The Internet/Intranet-connected AC electrical apparatus of claim 1, wherein the one or more programs is an Internet controlled means that controls electrical loads.

9. The Internet/Intranet-connected AC electrical apparatus of claim 1, wherein the one or more programs is a data collection means.

10. The Internet/Intranet-connected AC electrical apparatus of claim 9, wherein the data collection means acquires information on an attached sensor and stores the information within the computer means.

11. The Internet/Intranet-connected AC electrical apparatus of claim 1, wherein the application program is an instant messaging program.

12. The Internet/Intranet-connected AC electrical apparatus of claim 1, wherein the means for communicating is through a wired technology.

13. The Internet/Intranet-connected AC electrical apparatus of claim 1, wherein the means for communicating is through a wireless technology.

14. The Internet/Intranet-connected AC electrical apparatus of claim 1, wherein the electrical junction box is selected from a group comprising an outlet box, a switch box, a ceiling box, a wiring junction box, a wall box, or a receptacle box.

15. An Internet/Intranet-connected AC electrical apparatus, comprising:
a single housing means mountable within an electrical junction box;
a web server means that generates an electrical box web page, wherein said electrical box web page provides a set of functions for accessing information or controlling functions within said electrical junction box; and
a standard Internet interface that enables access to said web page by a web browser such that a user of the web browser accesses the functions for said electrical junction box wherein
the standard Internet interface uses a standard Internet network protocol, wherein the web server receives an HTTP command via the standard Internet interface and generates an HTML file that defines the electrical box web page in response to the HTTP command, and wherein the HTTP command specifies a URL corresponding to the electrical junction box.

16. The Internet/Intranet-connected AC electrical apparatus of claim 15, wherein the electrical junction box is an outlet box, a switch box, a ceiling box, a wiring junction box, a wall box, and a receptacle box.

17. The Internet/Intranet-connected AC electrical apparatus of claim 15, wherein the standard Internet interface comprises a wired communication interface.

18. The Internet/Intranet-connected AC electrical apparatus of claim 15, wherein the standard Internet interface comprises a wireless communication interface.

* * * * *

UNITED STATES PATENT AND TRADEMARK OFFICE
CERTIFICATE OF CORRECTION

PATENT NO. : 7,761,555 B1  Page 1 of 2
APPLICATION NO. : 10/214086
DATED : July 20, 2010
INVENTOR(S) : Richard Anthony Bishel It is certified that error appears in the above-identified patent and that said Letters Patent is hereby corrected as shown below:

At the end of Item (56) on the Title page of the patent, Under "U.S. PATENT DOCUMENTS," please insert the following:

| | | |
|---|---|---|
| --4,200,862 | 4/1980 | Campbell et al. |
| 5,949,779 | 9/1999 | Mestafa et al. |
| 5,973,696 | 10/1999 | Agranat et al. |
| 5,991,795 | 11/1999 | Howard et al. |
| 6,182,094 B2 | 1/2001 | Humpleman et al. |
| 6,198,479 B2 | 3/2001 | Humpleman et al. |
| 6,229,432 B2 | 5/2001 | Fridley et al. |
| 6,281,784 B2 | 8/2001 | Redgate et al. |
| 6,282,454 B2 | 8/2001 | Papadopoules et al. |
| 6,288,716 B2 | 9/2001 | Humpleman et al. |
| 6,370,448 B2 | 4/2002 | Ergurek |
| 2001/0025307 A1 | 9/2001 | Venkatraman et al. |
| 2001/0034154 A1 | 10/2001 | Elwahab et al. |
| 2001/0034772 A1 | 10/2001 | Venkatraman et al. |
| 2001/0034780 A1 | 10/2001 | Venkatraman et al. |
| 2001/0034781 A1 | 10/2001 | Venkatraman et al. |
| 2002/0002623 A1 | 1/2002 | Stead et al. |
| 2002/0027504 A1 | 2/2002 | Davis et al. |
| 2002/0040497 A1 | 4/2002 | Chai-- |

At the end of Item (56) on the Title page of the patent, Under "OTHER PUBLICATIONS," please insert the following:

--Fred Eady, "Weaving an Embedded Web," *Computer Design,* September 1997, pp. 1-6, www.computer-design.com/Editorial/1997/09/sup/997web.html, ED Technical Publications.

Linksys, "Exploring Home Networking," November 2000, pp. 1-14, Linksys.com/products/images/homenetworkinglinksys.pdf.

Signed and Sealed this

Twelfth Day of October, 2010

David J. Kappos
*Director of the United States Patent and Trademark Office*

Ian Agranet, "Embedded Web Servers in Network Devices," *Computer System Design,* March 1998, pp. 1-8, www.csdmag.com/main/9803.

Amitava Dutta-Ray, "Networks for Homes," *Home Networks,* March 2000, Vol. 2, No. 3, pp. 1-10, Information Gatekeepers, Inc., Boston, Massachusetts, U.S.A.

Steve Freyder, David Helland, and Bruce Lightner, "Look Ma, No PC. *Circuit Cellar,* August 2000, Issue 121, Circuit Cellar, Inc., Vernon, Connecticut, USA, pp. 20-29.

Myron Loewen, "Internet Appliance Interface," *Circuit Cellar,* July 1999, Issue 108, Circuit Cellar, Inc., Vernon, Connecticut, USA, pp. 24-34.

Jeremy Bentham, *TCP/IP Lean-Web Services for Embedded Servers,* (Lawrence KS:CMP Media, LLC, 2000), pp. 269, 291-296, 331-332.

Danny Briere and Pat Hurley, *Smart Homes for Dummies,* (Foster City, CA:IDG Books Worldwide, Inc., 1999), pp. 201-229, 269-286, 293.--